(12) United States Patent
Ljøsne et al.

(10) Patent No.: US 11,845,511 B2
(45) Date of Patent: Dec. 19, 2023

(54) SEQUENTIAL GEAR SHIFTER

(71) Applicant: CA TECHNOLOGY SYSTEMS AS, Oslo (NO)

(72) Inventors: Knut Tore Ljøsne, Oslo (NO); Christian Antal, Oslo (NO)

(73) Assignee: CA TECHNOLOGY SYSTEMS AS, Oslo (NO)

( * ) Notice: Subject to any disclaimer, the term of this patent is extended or adjusted under 35 U.S.C. 154(b) by 1300 days.

(21) Appl. No.: 16/081,794

(22) PCT Filed: Mar. 29, 2017

(86) PCT No.: PCT/IB2017/000322
§ 371 (c)(1),
(2) Date: Aug. 31, 2018

(87) PCT Pub. No.: WO2017/149396
PCT Pub. Date: Sep. 8, 2017

(65) Prior Publication Data
US 2019/0283839 A1    Sep. 19, 2019

(51) Int. Cl.
*B62M 11/06* (2006.01)
*B62M 9/06* (2006.01)
(Continued)

(52) U.S. Cl.
CPC .............. *B62M 11/08* (2013.01); *B62M 9/04* (2013.01); *B62M 11/04* (2013.01); *B62M 9/06* (2013.01); *B62M 25/04* (2013.01); *B62M 25/08* (2013.01)

(58) Field of Classification Search
CPC ..... B62M 11/08; B62M 11/06; B62M 11/145; B62M 11/16; B62M 11/18; B62M 9/06;
(Continued)

(56) References Cited

U.S. PATENT DOCUMENTS 2,741,896 A * 4/1956 Geiger ................... B60T 11/22
60/590
6,135,906 A    10/2000 Ichida
(Continued)

FOREIGN PATENT DOCUMENTS

DE        2416110 A1 * 10/1975
DE    10 2013 017 504 A1    4/2015
(Continued)

OTHER PUBLICATIONS

EPO Translation of DE 102013017504 A1, Blaschke, Apr. 23, 2015. (Year: 2022).*
(Continued)

*Primary Examiner* — Daniel D Yabut
(74) *Attorney, Agent, or Firm* — Birch, Stewart, Kolasch & Birch, LLP

(57) ABSTRACT

A sequential gear shift system for two-way operated speed change gear units of manually propelled vehicles. Mirrored, spaced-apart lever operators, are provided with increasing lever stroke ratio, and actuate sequentially with twin mirrored one-way multi-tooth rack-clutch mechanisms, that rapidly engage with a shift element and convert linear torque to rotate the shift element in diametrically opposite directions. The rack-clutch mechanisms may be disengaged from the shift element when returning to normal. The actuating may occur via independent hydraulic operation of an actuator. The actuator housing and load bearing axle of the speed change gear hub are selectively, releasably, and coaxially interconnected into a rigid gear system load bearing axle, and may be combined at any angle, and a shift direction is selectively reversible.

11 Claims, 27 Drawing Sheets

(51) Int. Cl.
*B62M 25/04* (2006.01)
*B62M 25/08* (2006.01)
*B62M 11/04* (2006.01)
*B62M 9/04* (2006.01)

(58) Field of Classification Search
CPC ....... B62M 25/08; B62M 25/04; F16H 3/083; F16H 2063/3096; Y10T 74/20558; Y10T 74/2057
See application file for complete search history.

(56) References Cited

U.S. PATENT DOCUMENTS

| | | | | |
|---|---|---|---|---|
| 6,142,899 | A * | 11/2000 | Liu | B62M 25/08 474/70 |
| 6,149,541 | A | 11/2000 | Nakamura et al. | |
| 6,244,207 | B1 | 6/2001 | Chen | |
| 6,244,415 | B1 | 6/2001 | Fujii | |
| 2006/0185943 | A1* | 8/2006 | Takizawa | B62L 3/023 188/73.1 |
| 2009/0062057 | A1* | 3/2009 | Fujiwara | B62M 11/18 475/305 |
| 2013/0150200 | A1* | 6/2013 | Schmitz | F16H 37/04 475/207 |
| 2015/0159736 | A1* | 6/2015 | Storti | F16D 41/088 74/333 |

FOREIGN PATENT DOCUMENTS

| | | |
|---|---|---|
| EP | 0 826 591 A2 | 3/1998 |
| GB | 2 464 302 A | 4/2010 |
| WO | WO 2006/033080 A1 | 3/2006 |

OTHER PUBLICATIONS

EPO Translation of DE 2416110 A1, Kroniger, Oct. 16, 1975. (Year: 2022).*
International Search Report and Written Opinion dated Sep. 19, 2017 issued in International Application No. PCT/IB2017/000322.
Norwegian Search Report dated Aug. 23, 2016 issued in corresponding Norwegian Patent Application No. 20160345.

* cited by examiner

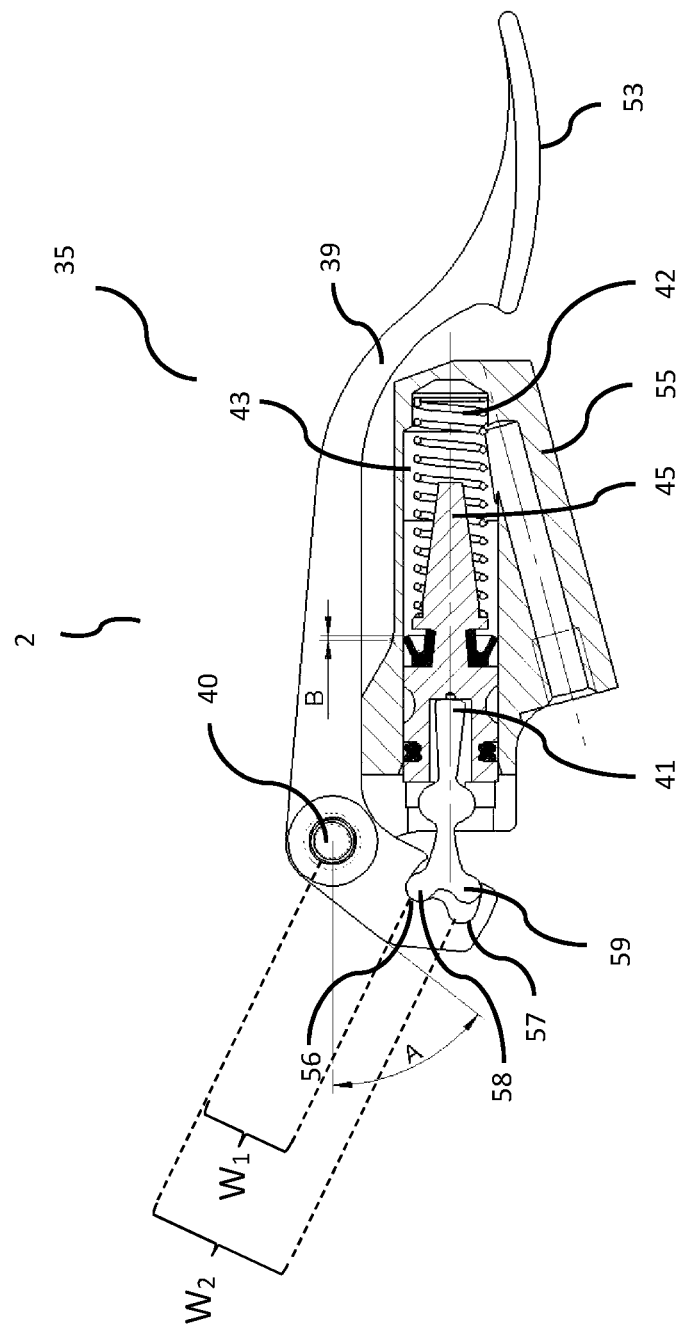

SEQUENTIAL GEAR SHIFTER

CROSS-REFERENCE TO RELATED APPLICATIONS

This application is a 35 U.S.C. § 371 National Phase of PCT Application No. PCT/IB2017/000322 filed Mar. 29, 2017, which claims priority to Norwegian Application No. NO 20160345 filed Mar. 1, 2016. The disclosures of these prior applications are hereby incorporated by reference herein.

FIELD OF INVENTION

The present invention relates to sequential gear shifters for pedally propelled vehicles, and means for shifting gear ratios and structurally supporting internal gear systems.

BACKGROUND INFORMATION

Gear shift systems for internal speed change gear units comprise in essence three parts or functions; an operator, transfer means, and an actuator. Operators with twist grips or levers send signals by means of cables, rods, gases, fluids, or electrical impulses to the actuator, that interprets and converts shift signals by means of e.g. racks and gears, rods, pivoting quadrangular rhomboids, rotatable shift sleeves, and piggyback converter units, into a motion desired, e.g. sliding of rods or circumferential rotation of sleeves.

Advanced two-way gear units are shifted by reciprocating twist-operators, with an incoming spool for collecting wire, an actuator with a corresponding spool, and twin cable transfer devices with an inner wire stretching from the operator to the actuator and back to said operator again. As wire is pulled from the actuator and collected onto the operator spool, wire is released from the operator and collected onto the actuator spool. Shift torque can be adjusted during shifting. However, twin wire systems are weighty, hard to adjust and to operate, high maintenance, and wide bodied. Wide actuator bodies are placed outside the frame axle mounts, and are there vulnerable to impact damage.

Liquid and gaseous systems are lighter and less hard to operate. WO2006033080A1 has two closed hydraulic chambers, each engaging a linear tooth rack, which continuously mesh with a single jockey and sequentially operate said jockey in diametrically opposite directions. While slim in design, continuous meshing limits the number of ratios that can be shifted per stroke, and requires adjustable ratcheting levers. EP0826591 shifts by gas pressure provided from a gas tank, pushing a piston, engaging a first pawl clutch to rotate a jockey while a mirrored clutch remains idle, tilting a derailleur parallelogram or pushing axial rods of an internal gear system. With binary shift torque, the number of gear ratio changes per air pressure release is limiting, and modulating the shift torque is impossible.

It also requires frequent re-pressurization. A similar wire operated mechanism is shown in DE102013017504A1, with two opposing single ratchet teeth, sequentially pulled, gripping and rotating a rotatable shift sleeve, before releasing the sleeve and returning to normal. This invention allows just very degrees of shift rotation and few gear shifts per actuation, does not have instant engagement, and similarly as above, is axially voluminous. A way to operate such gear shifters is to use simple brake levers. Linear levers cannot shift many gears, and to make things worse, some such levers are provided with a decreasing transfer pattern, to enhance modulation in the latter part of the brake stroke.

From this discussion should be apparent a need for better gear shift systems for and that providing an attractive such mechanism represents a considerable technical challenge.

SUMMARY OF THE INVENTION

The objective of the present invention is to provide a new and improved gear shift system for internally geared speed change gear systems, that is reliable, precise, light-weight, robust, versatile, low-maintenance, easily set up and adjusted, easily manufactured, intuitively used, and lightly operated, that allows independent and separate shifting towards a higher and a lower gear ratio, perpetual shifting in either direction, the possibility to switch shift directions with ease, and lever initiation from the same normal position every time. It is a further objective to create such a shifter that has instant shift engagement, a slim actuator well-protected from external impacts, a rigid and versatile interface with a wheel, and that shifts many gear ratios in a single lever throw.

In order to accomplish these and other objectives, a gear shift system is provided, comprising a shift operator, a transfer device, and an actuator. A one-way clutch is operated by an operator device in one direction, rotating a shift element, and returned to the initial position without rotating the element. A second, identical one-way clutch is operated by said operator, rotating the element in the circumferential opposite direction. When one clutch is in engagement with said element, the oppositely arranged clutch is in a resting position, not in engagement with the element. Said clutches may comprise a linear rack with two or more teeth, to allow engagement over a length of rack body and a great number of degrees of shift element rotation. It is preferable to have shifting of multiple speeds per lever stroke. If a gear system requires 360° rotation of the shift element to shift through 14 speeds, then it is preferable with at least 50° rotation per lever stroke. Furthermore, said mechanisms may comprise means for rapid engagement with said shift element, and for rapid disengagement from the same element.

The operator may have two identical operator handles, one operating each clutch, working fully independently of the other and possibly spread apart e.g. on each side of the handlebar, for operation by a right and left hand respectively, like paddle shifting in racing cars. It may have an accelerating shift torque transfer pattern, where this may be achieved in various manners, in case of a lever operated device, comprising e.g. a lever operation area, a lever pivot, and a lever abutment point, distance between said abutment point and pivot point may arranged to increase during the lever stroke.

To achieve said objectives, the invention may be placed between the wheel mounts of the frame. Given a wheel comprising a stationary load bearing wheel axle, surrounding a rotatable shift element, said invention requires means for radially converting linear shift torque into rotational through said load bearing axle, and such means preferably allowed to access the rotatable shift element at any circumferential position and removal of the wheel without exposing inner gear or shift mechanisms. To achieve said objectives, the invention may further be arranged to function as a structural part of the wheel or stationary load bearing wheel axle during use, and releasable from the same wheel.

By such configuration is provided a functional and versatile gear shift system, with rapid engagement and release; a light shift feel yet is possible to shift more ratios in a single stroke; a simple and easily assembled structure; self-calibration and ease of installation; actuation of gear systems irrespective of shift axle rotation or speeds, and optimized integration with the frame and gear unit.

The invention has been described in general. Further objects, characteristics and effects will be apparent from the description with references to the attached figures and models.

BRIEF DESCRIPTION OF THE DRAWINGS

FIGS. 16*a*-16*e* show the operation cycle.

DESCRIPTION OF THE INVENTION

Figure 1:
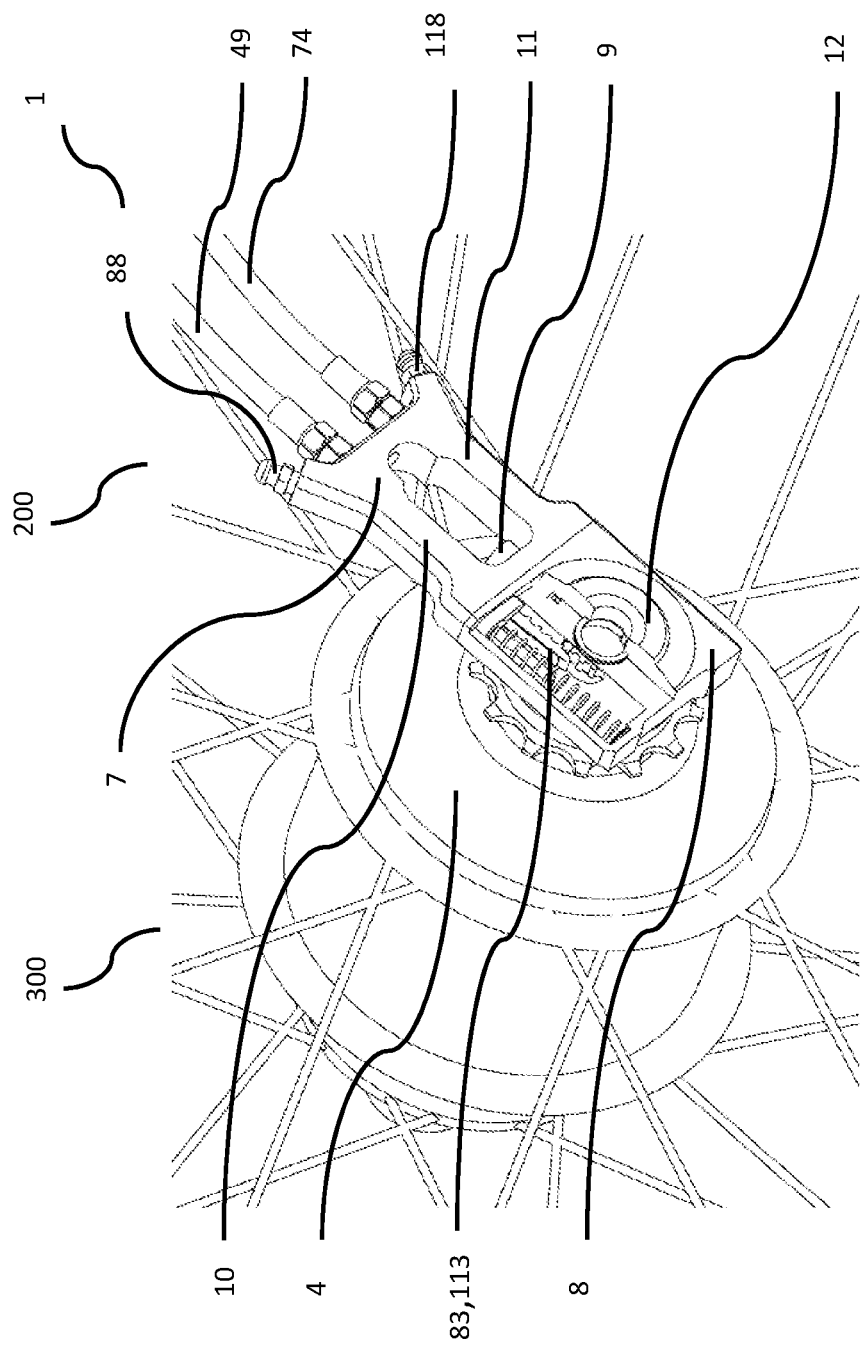
FIG. 1 shows the actuator and speed change gear unit.
Figure 2A:
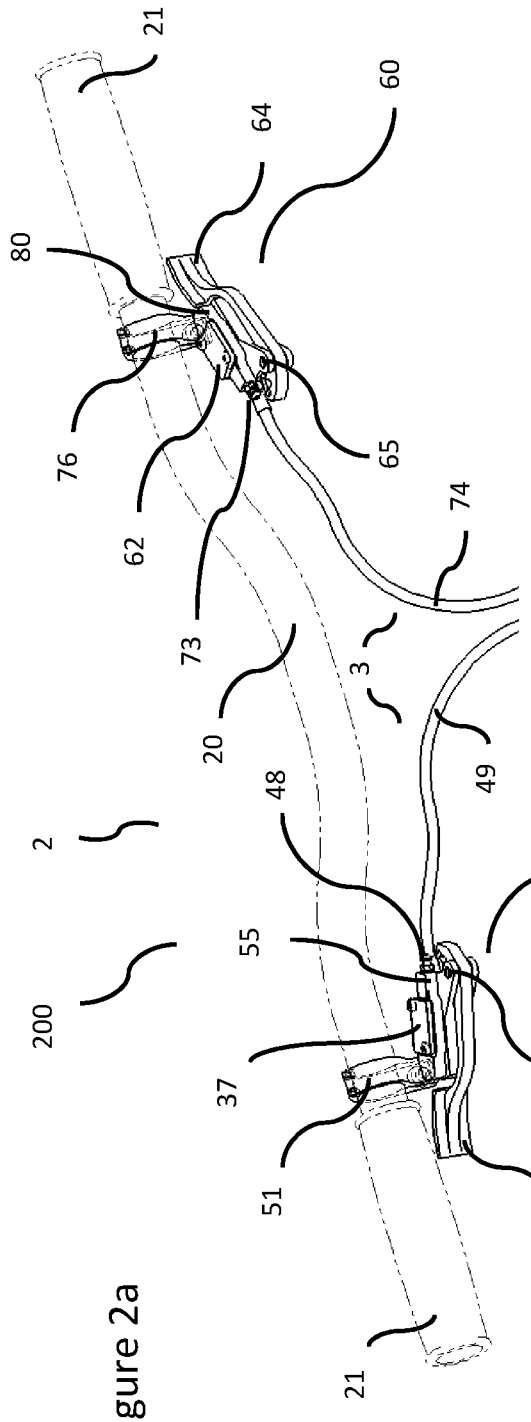
FIGS. 2*a-b* show the operators mounted on the handlebar from front and rear.
Figure 2B:
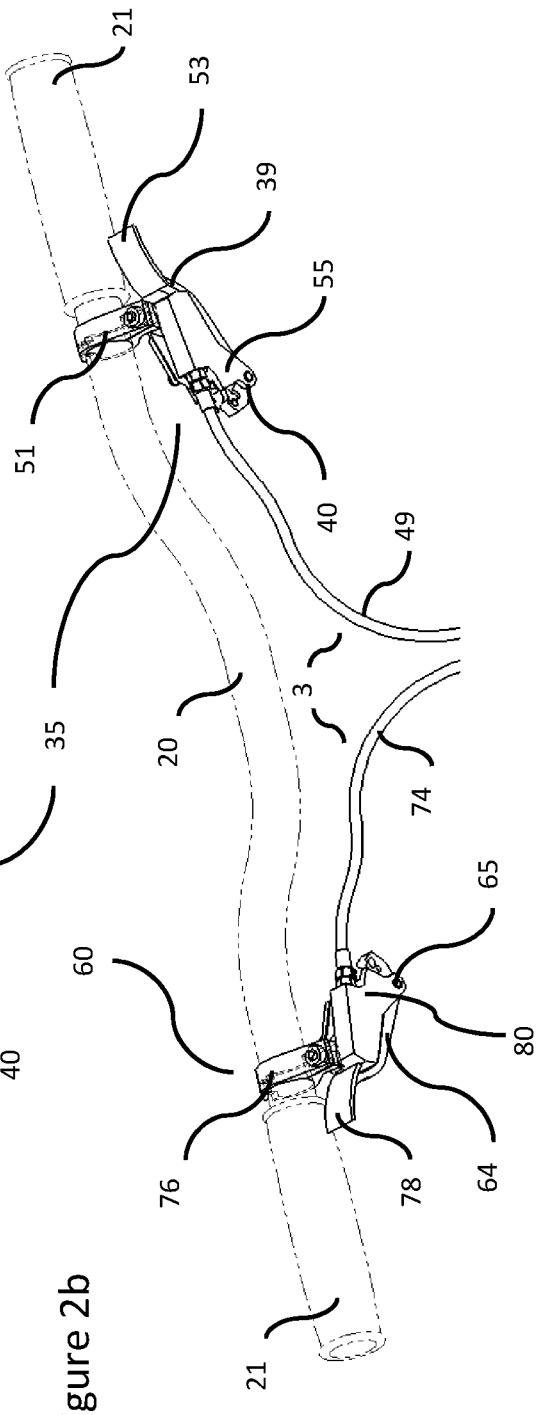
Figure 3:
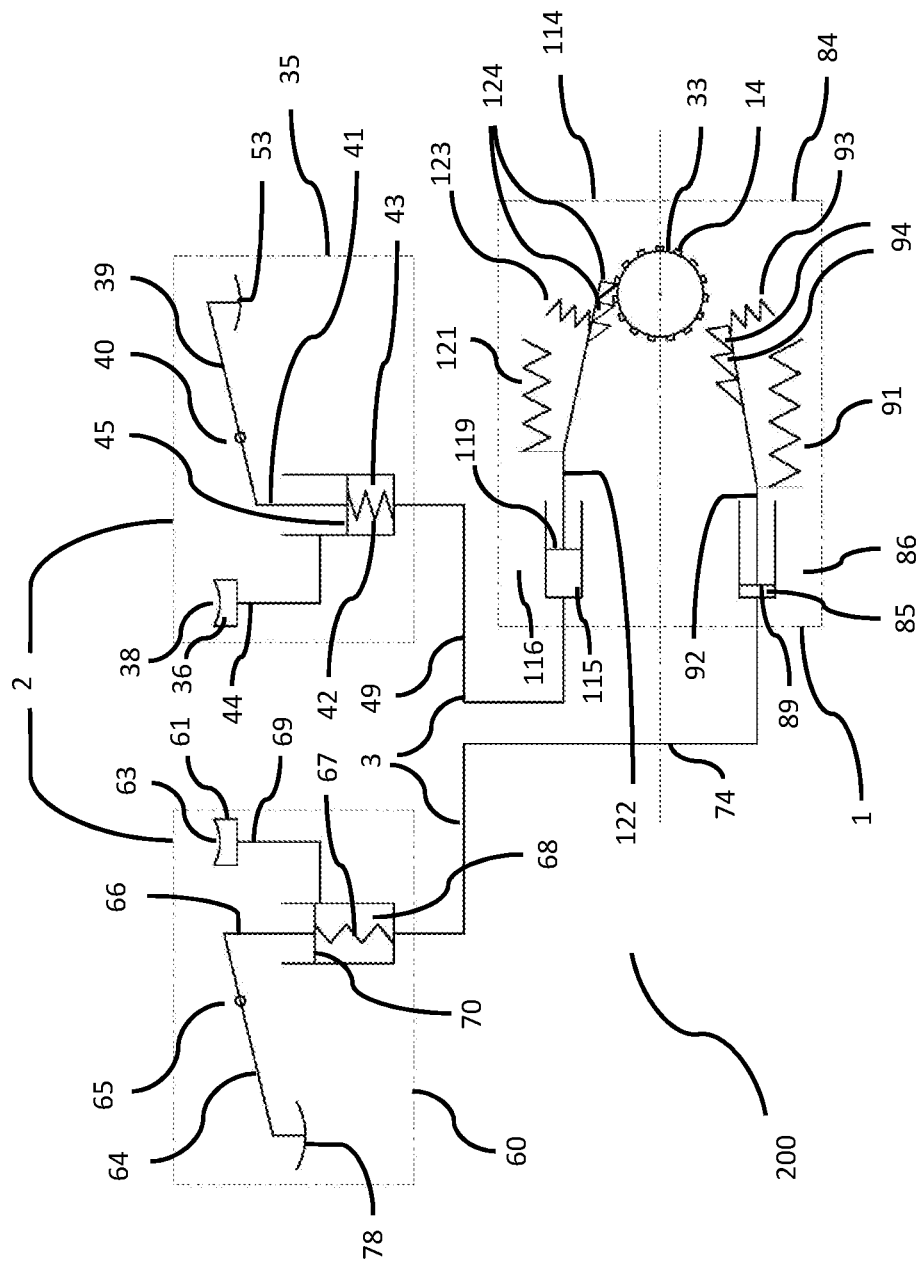
FIG. 3 shows a system drawing of the invention.

Referring initially to FIG. 1-3, a sequential gear shift system (200) for pedal driven vehicles comprises a single actuator device (1), an operator device (2) with two separate operator units (35, 60), and a transfer device (3) with two transfer units (49, 74), wherein the actuator (1) is connected with the operator units (35, 60) by means of the transfer units (49, 74). The gear shift system (200) allows the user to selectively shift the gear ratios of an internal speed change gear unit (4) (e.g. WO2012128639), and together these two (200, 4) comprise a gear system (300). The actuator (1) has an upper actuator housing (7) and a lower actuator housing (8), bolted together by means of a connection bolt (9), the upper housing (7) having a first and a second actuator pillar (10, 11), each in turn receiving a first and a second hydraulic cable (49, 74) which connect the actuator (1) to the operators (35, 60), and a first and second actuator bleed nipple (88, 118), and said lower housing (8) being hollow around the rotational center of the gear unit (4), and surrounding this on each axial side (one side shown) is a bicycle frame clamp area (12). Within the cross section of the lower housing (8) can be seen certain clutch mechanisms (83, 113) for converting linear shift torque into rotational, whose structure and function will be described below. Moving to FIGS. 2*a-b*, the handlebar (20) with handlebar grips (21) mounted thereto is seen front and rear, a first operator unit (35), and a second operator unit (60), each comprising an operator housing (55, 80) with a handlebar clamp (51, 76), an operator lever (39, 64) hinged onto an operator joint (40, 65) and having a user interface point (53, 78), an operator bleed nipple (48, 73), a reservoir cover (37, 62), and a transfer device (3) with transfer units (49, 74), connecting the operator unit (35, 60) to the actuator (1). In the FIG. 3 system drawing, the actuator (1) is apparently mirrored along its longitudinal axis, having an upper and a lower actuator section (84, 114), and a central shift element (33) with a pinion ring (14). The upper and lower actuator sections (84, 114) comprise each a slave hydraulic chamber (86, 116), receiving a first and a second hydraulic cable (49, 74), with a slave piston (89, 119) mounted therein, onto which is mounted an actuator linear push rod (92, 122), with a linear return means (91, 121) pushing the push rod (92, 122) towards the normal position. Pivoted onto the linear push rod (92, 122) is a multi-tooth rack (94, 124) with a lateral engagement means (93, 123), biasing the tooth rack (94, 124) laterally towards the pinion ring (14). In the lower section (84), said piston (89) is seen in its innermost position, and in the upper section, said piston (119) is in a halfway engaged position. Similarly, the operator device (2) comprises apparently two separate and mirrored, right and left operator unit (35, 60), where the left operator (60) is shown in normal position, and the right operator (35) is halfway through its stroke. The right and left operator units (35, 60) each comprise a lever (39, 64) with a user interface point (53, 78), a pivot point (40, 65), a push rod (41, 66) attached to a master piston (45, 70), operably slidable within a master hydraulic chamber (43, 68) and return sprung by means of a return means (42, 67). From the normal position, two paths are available for hydraulic fluid, through the transfer device (3) to the slave hydraulic chambers (115, 85), and through a reservoir passage (44, 69) to a master reservoir (36, 61) sealed by a thermal compensation rubber diaphragm (38, 63). In FIG. 3, said right lever (39) has been pivoted around said pivot point (40), pushing said push rod (41), in turn sliding said piston (45) through said master hydraulic chamber (43), biased by said return means (42). Access to said reservoir passage (44) is closed and hydraulic fluid has passed through said transfer unit (49) from said master hydraulic chamber (43) to said slave hydraulic chamber (115), within which said slave piston (119) is pushed by the fluid, pushing said push rod (122). Said multi-tooth tooth rack (124) is engaged to rotate said pinion ring (14) in the opposite direction of the rotational direction of the other said tooth rack (94), said lateral engagement means (123) biasing said tooth rack (124) towards engagement, while said linear return means (121) is compressed by hydraulic pressure.

Figure 7:
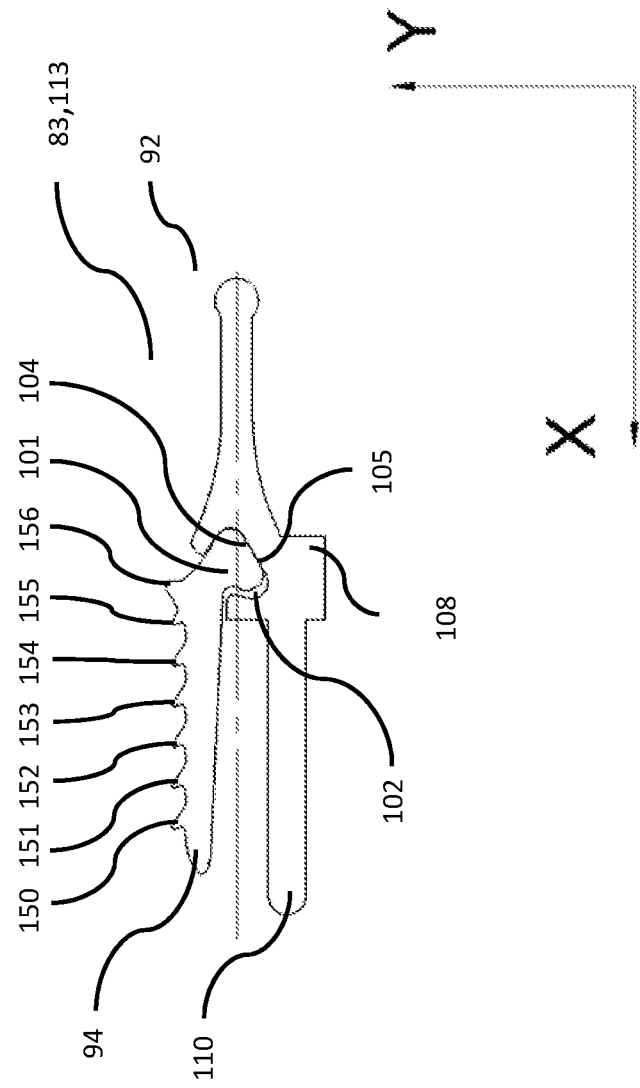

With reference now to FIGS. 4-7, the structure of the actuator (1) will be described in detail. Looking first at FIGS. 4 and 5, the upper actuator housing (7) and the lower actuator housing (8) are clearly mirrored along the longitudinal X axis. Since the internal and external features of the lower (84) and upper (114) parts of the actuator (1) are mirrored and identical, only one section (84) will be described. Said upper housing (7) comprises a first hollow actuator pillar (11) defining a longitudinal direction (X), with liquidly access only by means of an actuator bleed nipple (88), protruding at an angle in the XY-plane, and a means (97) for receiving a hydraulic hose (49) arranged longitudinally and slightly offset. Said pillar (11) contains a hollow hydraulic slave chamber (85), within which is sealably and longitudinally operably arranged a hydraulic piston (89). The lower actuator housing (8) is rectangular, with a shift element hole (16) penetrating perpendicularly through its relative center (Z), within which can be seen a pinion ring (14), in this embodiment with 16 teeth, provided to facilitate operable rotation of the shift element (33), and tangential to said hole (16), in the longitudinal direction, is an actuator chamber (86), in linear continuation of said slave chamber (85), allowing linear tangential engagement with said pinion ring (14). Looking now at FIGS. 6 and 7, extending from the hydraulic slave chamber (85) of the upper actuator housing (7), to the far end of the chamber (86) of the lower actuator housing (8), a more detailed look at the clutch element (83). snapped onto the piston (89), with slight angular play in the XY plane, is the linear push rod (92), comprising a piston arm (103), a push rod bay (102) with a flat back section (105), an upper housing stop (108), and a linear spring guide (110). Inserted into the bay (102) in the Z-direction is the peninsula (101) of a multi-tooth tooth rack (94), and slid onto the linear guide (110) in the X-direction is an actuator engagement means (93), a steering bushing (96), and finally a linear return means (91). In the normal position, when the upper (7) and lower actuator housings (8) are bolted together by means of the bolt (9), the return means (91) rests within the actuation chamber (86), pushing against the lower housing (8) in its one end and the bushing (96) in its other, biasing the piston (89) so that said hydraulic chamber (85) is at its minimum volume. In the bottom part of the pillar (11) is a linear push rod housing stop (107) and a tooth rack disengagement ledge (109). As can be seen, the actuator (1) is simple and comprises few parts. Looking now more closely at the clutch elements (83) in FIG. 6, the tooth rack (94) is provided with a linear row of teeth, first six forwardly protruding, one-way engagement teeth (150, 151, 152, 153, 154, 155) followed by one oppositely pointing tooth rack disengagement tooth (156). Said peninsula (101) and bay (102), prevent the tooth rack (94) from separating fully from the push rod (92) in the XY plane, while providing sufficient freedom for slight movement in this plane from the upper right side in the bay (102) to the bottom left side, and slight pivoting around a virtual bay (102) center. Yet when the tooth rack (94) and linear push rod (92) experience compressive force against each other along the X-axis, said parts will operate as a single unit. FIG. 7 shows the structural elements enabling this, the flat V-shape of the peninsula (101) in the longitudinal direction and flat back section (104) on the opposite side of the row of rack teeth (150-156), and the corresponding V-shape and flat back section (105) of the bay (102), the function of which is explained bellow. Said oppositely arranged clutch element (113) is identical and mirrored to said first element (83).

Figure 8:
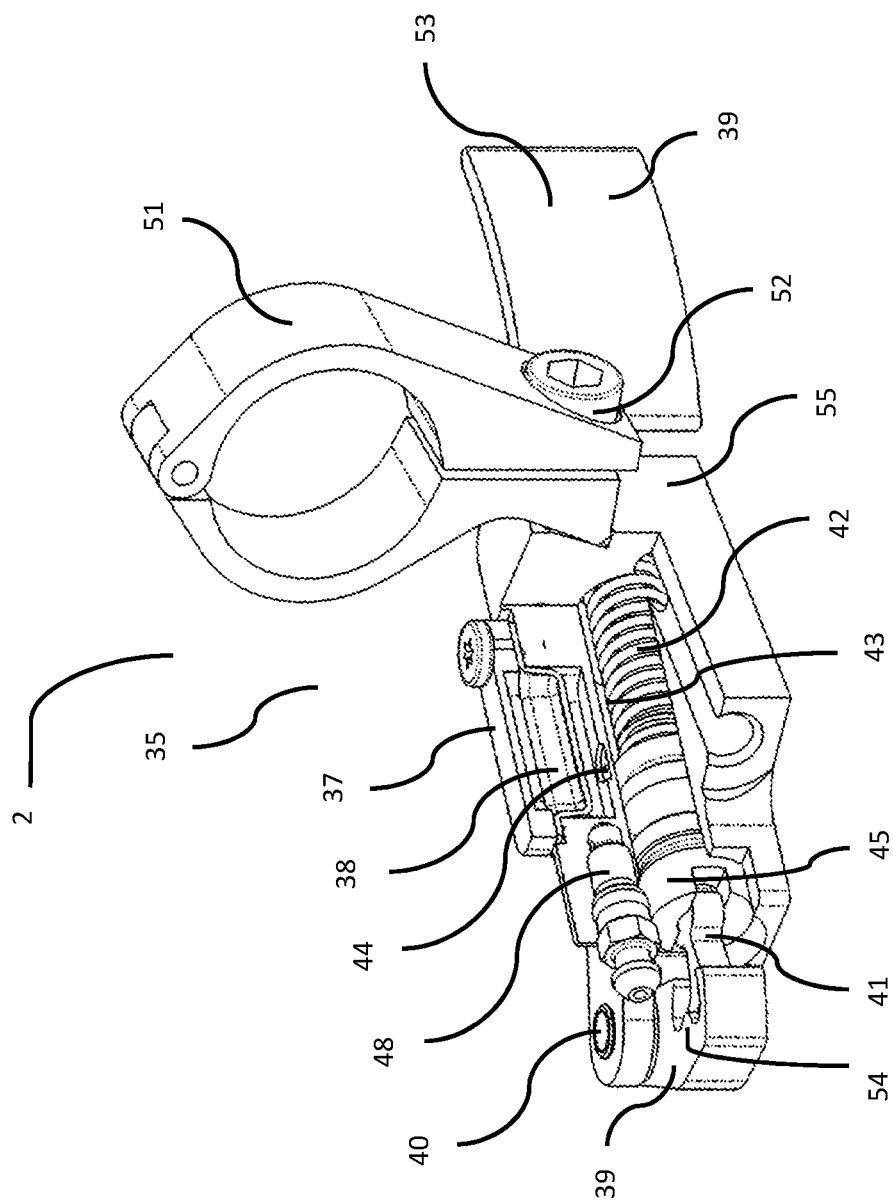
FIG. 8 shows a sideway longitudinal cross section of the operator.
Figure 9:
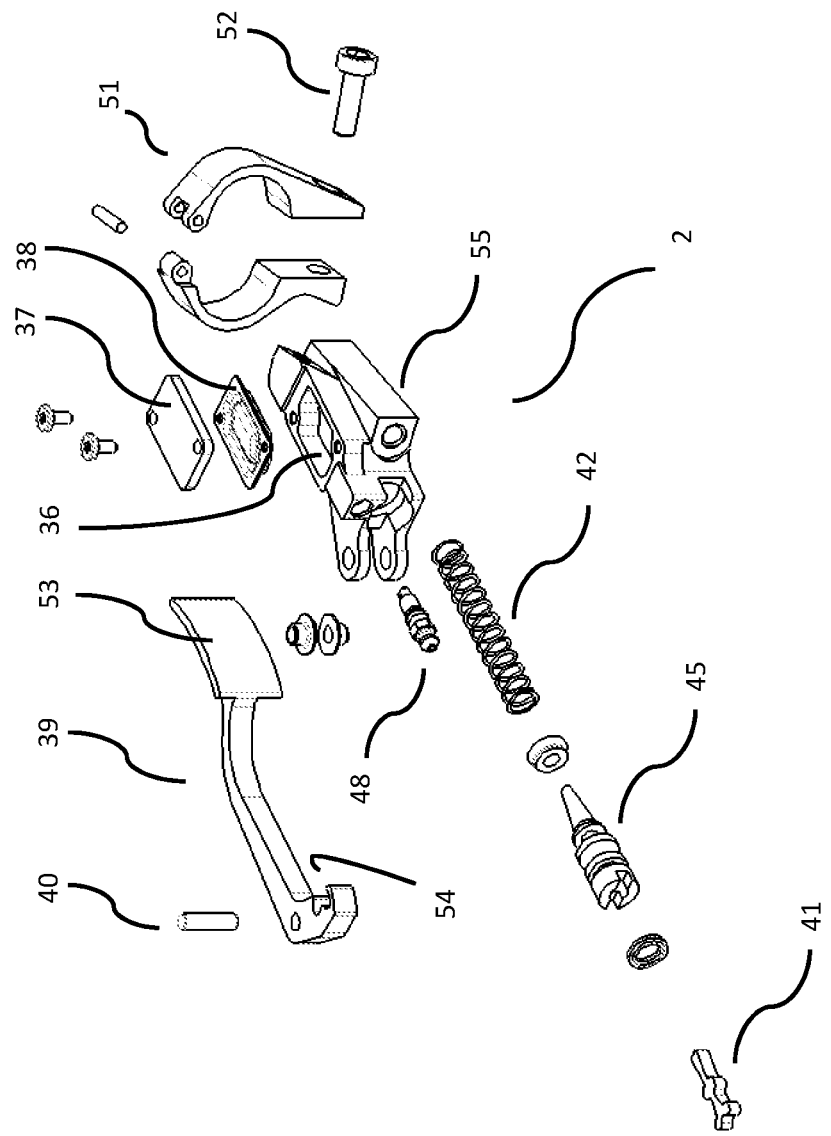
FIG. 9 shows an exploded cross section of the operator.
Figure 10A:
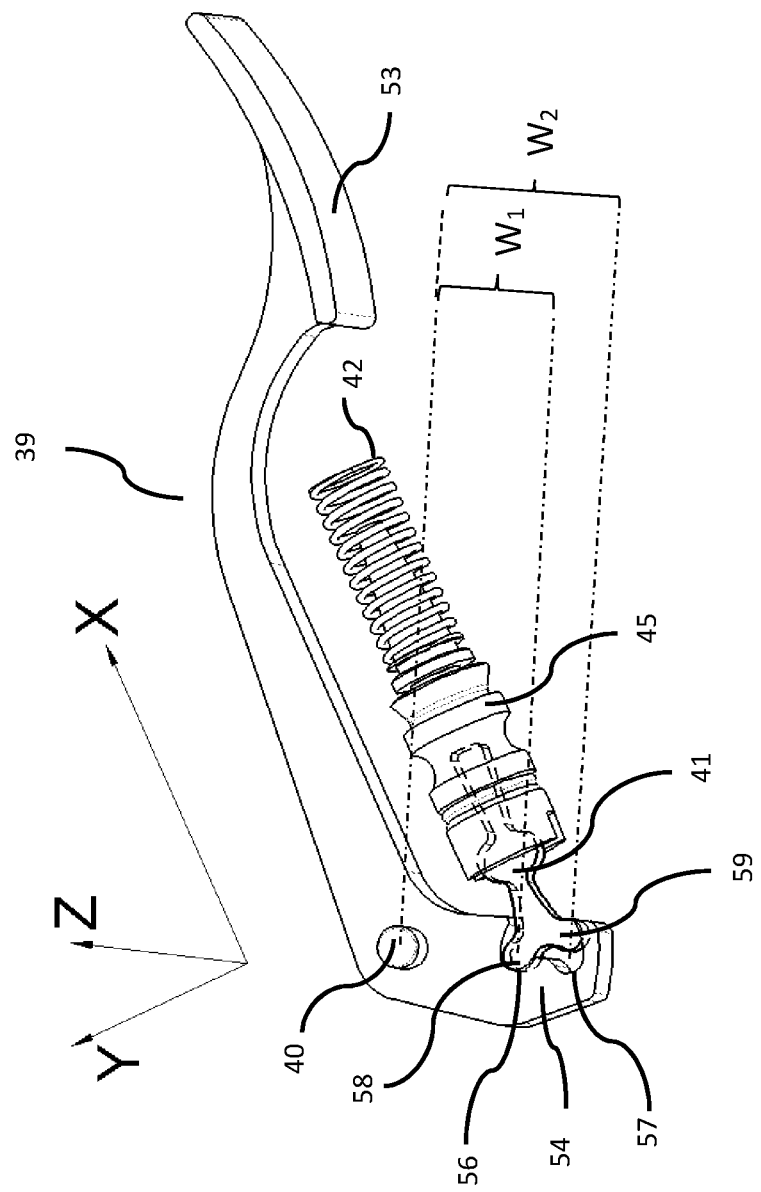
FIG. 10*a* shows the operator push rod system.
Figure 10B:
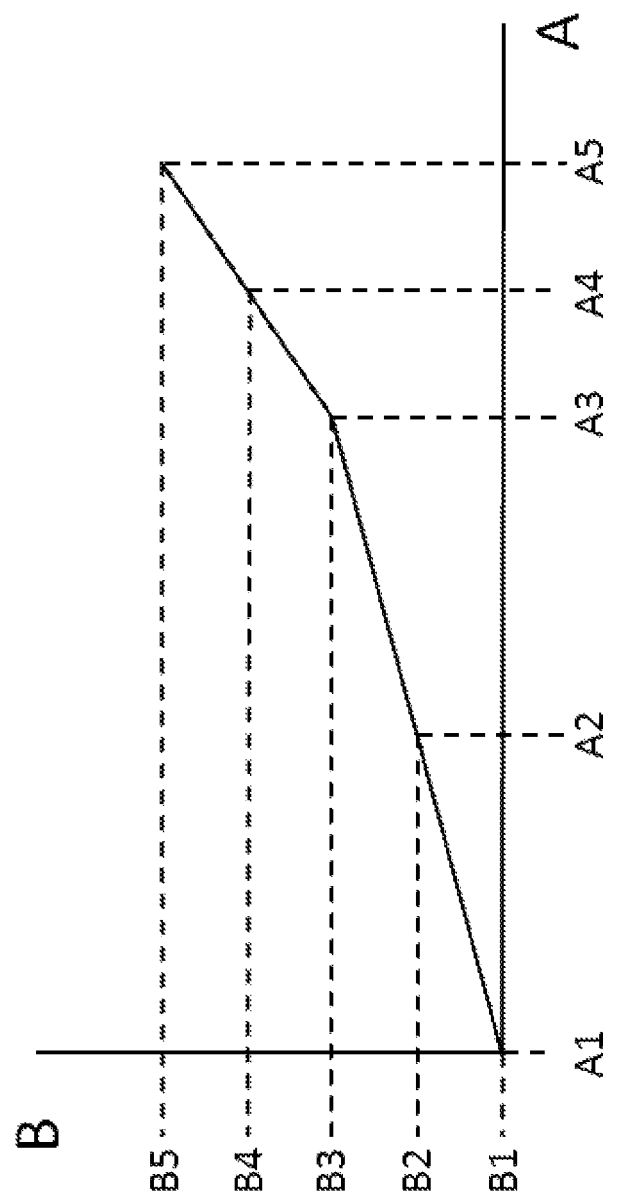
FIG. 10*b* shows the ratio change between master cylinder and lever travel.
Figure 11:
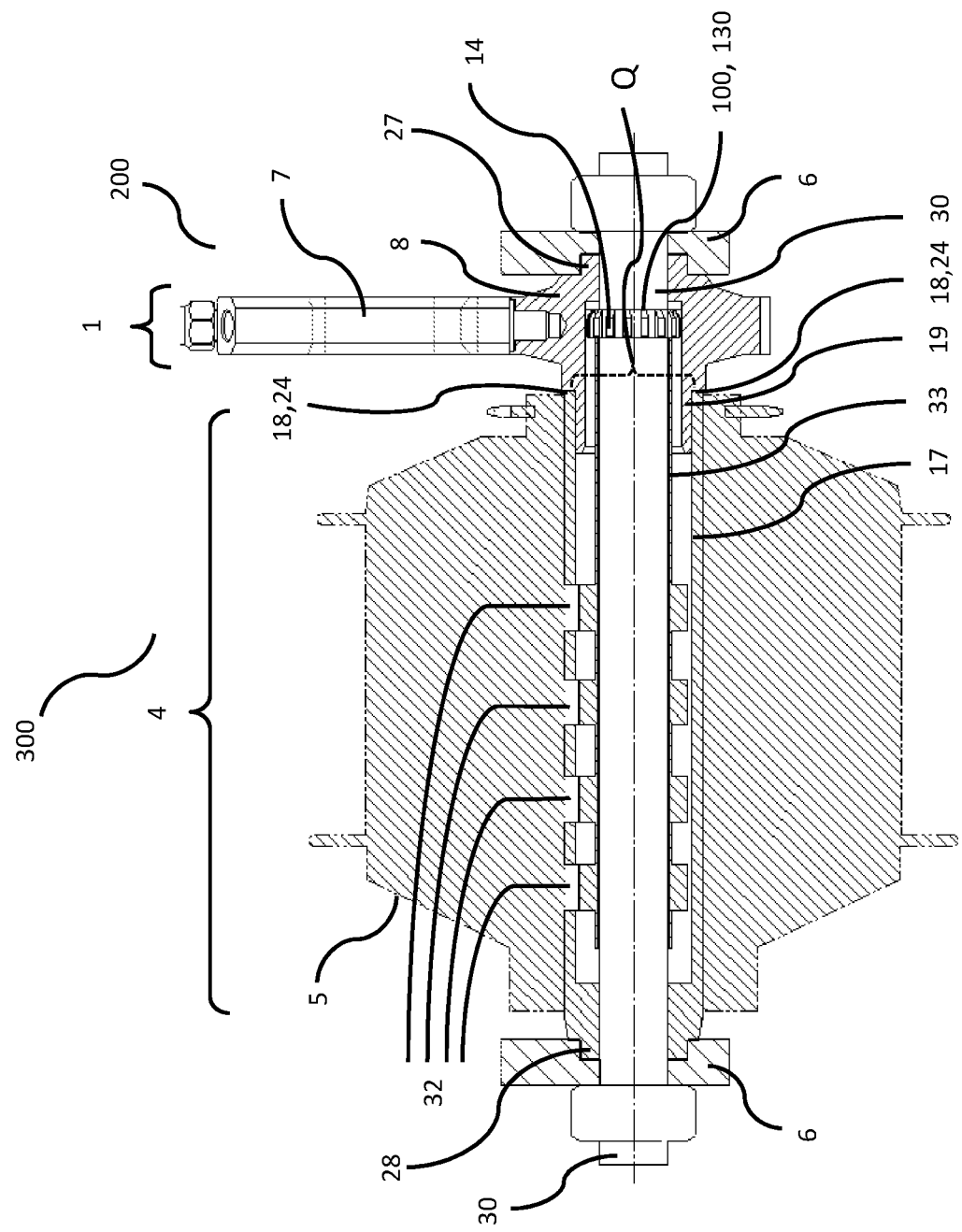
FIG. 11 shows a cross section of the speed change gear unit and actuator.
Figure 12:
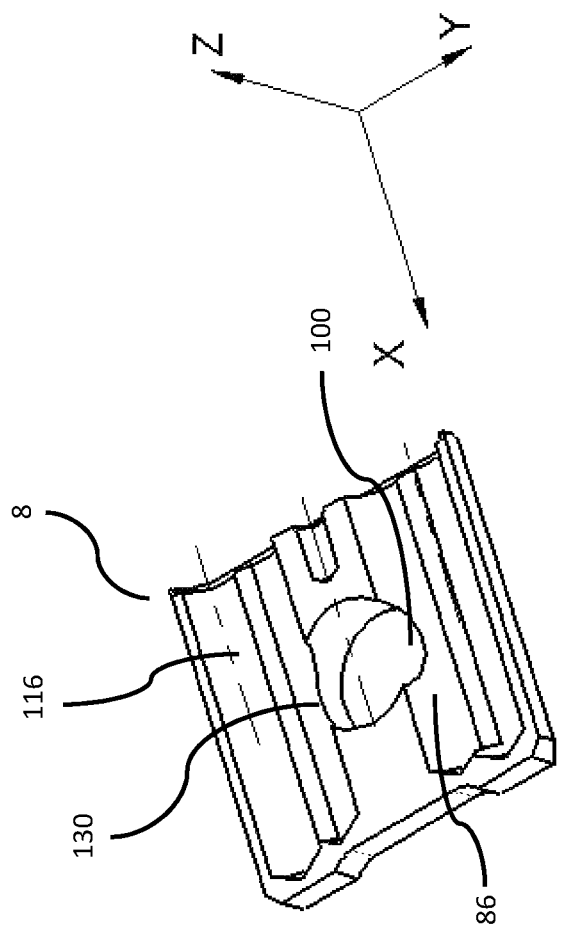
FIG. 12 shows a cross section of the lower housing.
Figure 13:
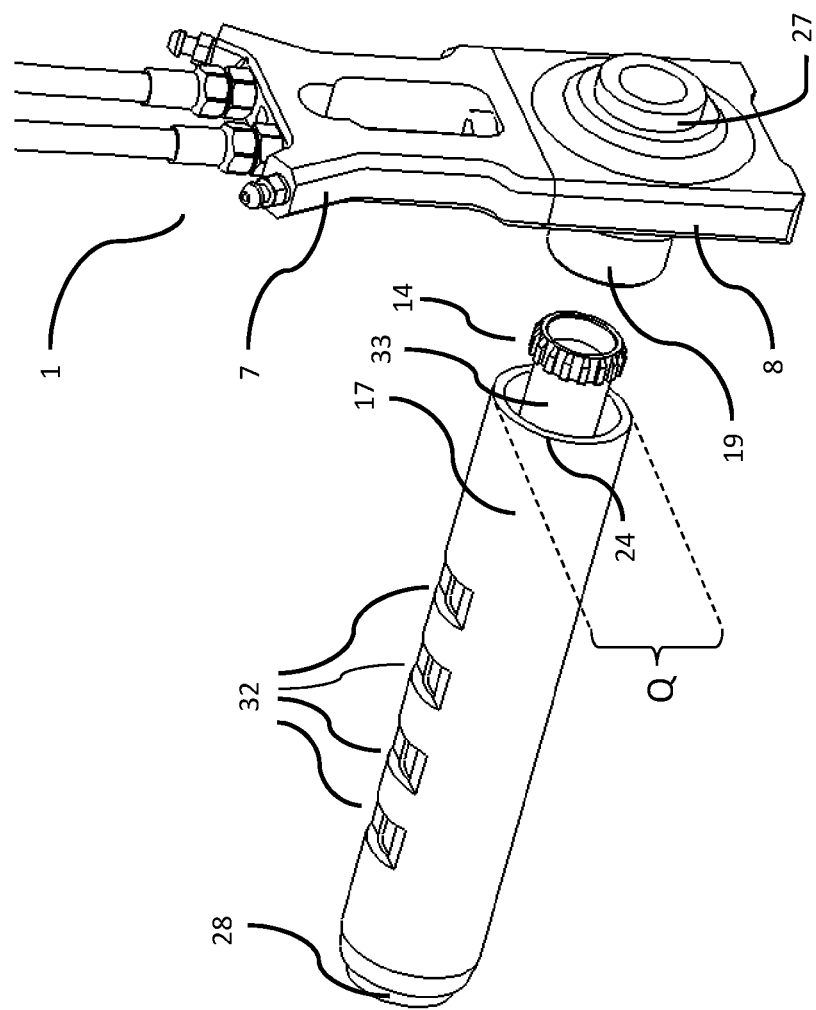
FIGS. 13-14 show the speed change gear unit and the actuator housing.
Figure 14:
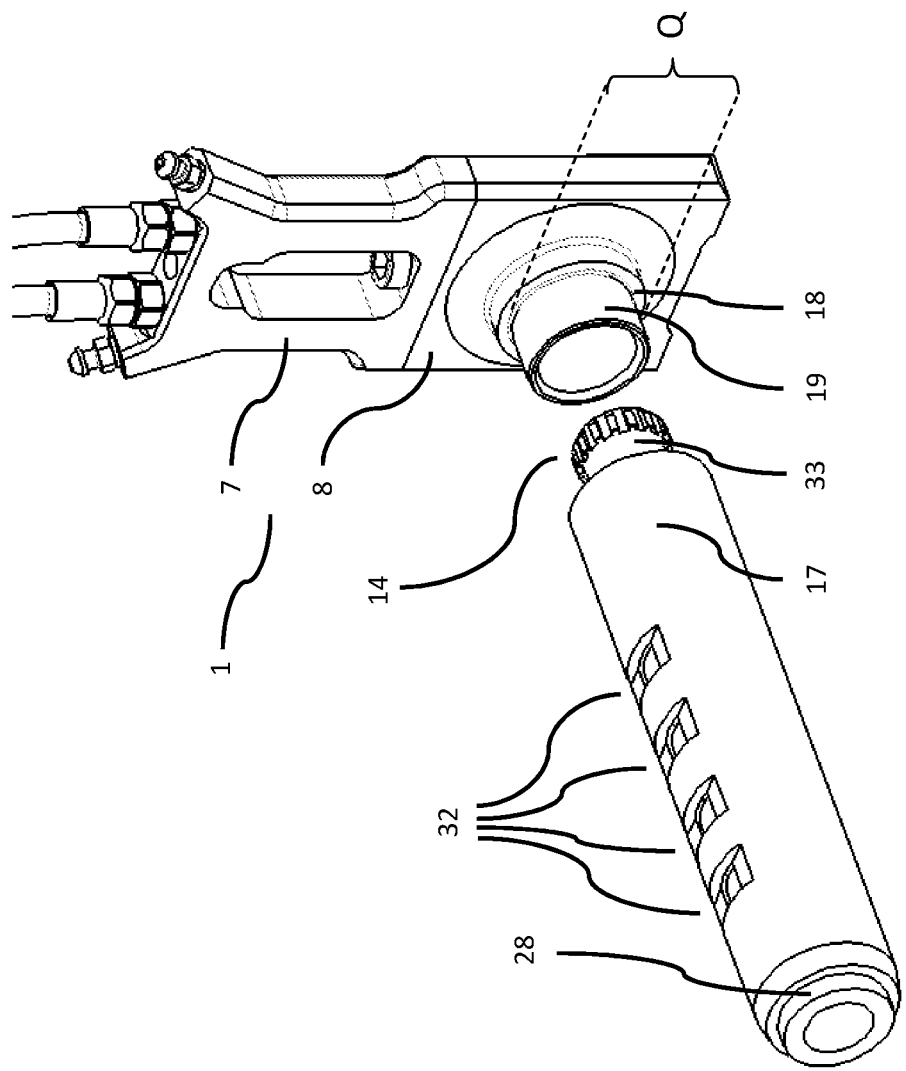

With reference now to FIGS. 8, 9 and 10, the structure of the operator (2) will be described. Since the operators (35, 60) are mirrored, the structure of both will be apparent by the description of either the right or left. The operator (35) comprises an operator lever (39), with a rider interface point (53) in its one end, a pivot point (40), and on the other side an operator push rod engagement bay (54) with two sub bays (56, 57). Operated by the push rod (41) is a master piston (45), slidably mounted with seals or the like within the master hydraulic chamber (43), and held in its normal position by means of a master piston return means (42). See from FIG. 9, that a functional operator (2) comprises few parts. In FIG. 10 is seen that the first push rod engagement bay (56) is located close to the pivot point (40) at distance $W_1$, while the second push rod engagement bay (57) is located beyond the first (56), at distance $W_2$. Correspondingly, the master push rod (41) has a first lever engagement ear (58) which in normal position is in engagement with the first push rod engagement bay (56) and a second lever engagement ear (59) which in normal position is not in engagement.

Referring to FIGS. 11-14, the structural interaction of the actuator (1) with the speed change gear unit (4) will now be described. The gear system (300) comprises both the speed change gear unit (4) and the shift system (200). The gear unit (4) inner mechanisms are not shown in the figures, and may vary within the boundaries of the description that here follows. Said rotatable shift element (33), hub gear (4) and gear shift actuator (1) are hollow and arranged to releasably receive a through-bolt (30), arranged to hold said gear system (300) between frame mounts (6) of a pedally propelled vehicle frame. On the left side, the vehicle frame (6) rests onto the bolt (30) by the hub carrying element (28), provided as part of the speed change gear unit (4), and on the right side the vehicle frame (6) rests onto the bolt (30) by the actuator carrying element (27), provided as part of the actuator (1). Inside said system (300), defining a center of rotation, is a hollow cylindrical non-rotatable main load bearing axle (29), which in turn comprises two sections, a hollow cylindrical speed change gear unit fixed axle (17), which structurally is part of the gear unit (4), and a hollow cylindrical actuator housing fixed axle (8), which structurally is part of the shift system (200), or more specifically, the actuator (1). The actuator housing fixed axle (8) is provided with radially penetrating means (100, 130), and a hollow cylindrical axially protruding hub axle entry sleeve (19), with a non-indexed planar circumferential axle abutment area (18) of a relatively large diameter Q at its base. The gear unit (4) on its part, is provided with a non-indexed planar actuator abutment area (24) of a corresponding diameter Q. Inside the gear unit (4) are various internal gear mechanisms (not shown), radially arranged between a gear unit fixed axle (17) and a shell (5), and within the gear unit fixed axle (17), protruding axially on one side from the gear unit (4) into the actuator housing fixed axle (8), is a rotatable shift element (33), circumferentially provided with e.g. cams or slots (not shown), to operate radially outwards said not shown gear mechanisms through penetrations (32) in the fixed gear unit axle (17). Said shift element (33) is operably radially accessible for various mechanisms that may actuate through said radial penetration means (100, 130) of the actuator housing fixed axle (8).

Figure 15A:
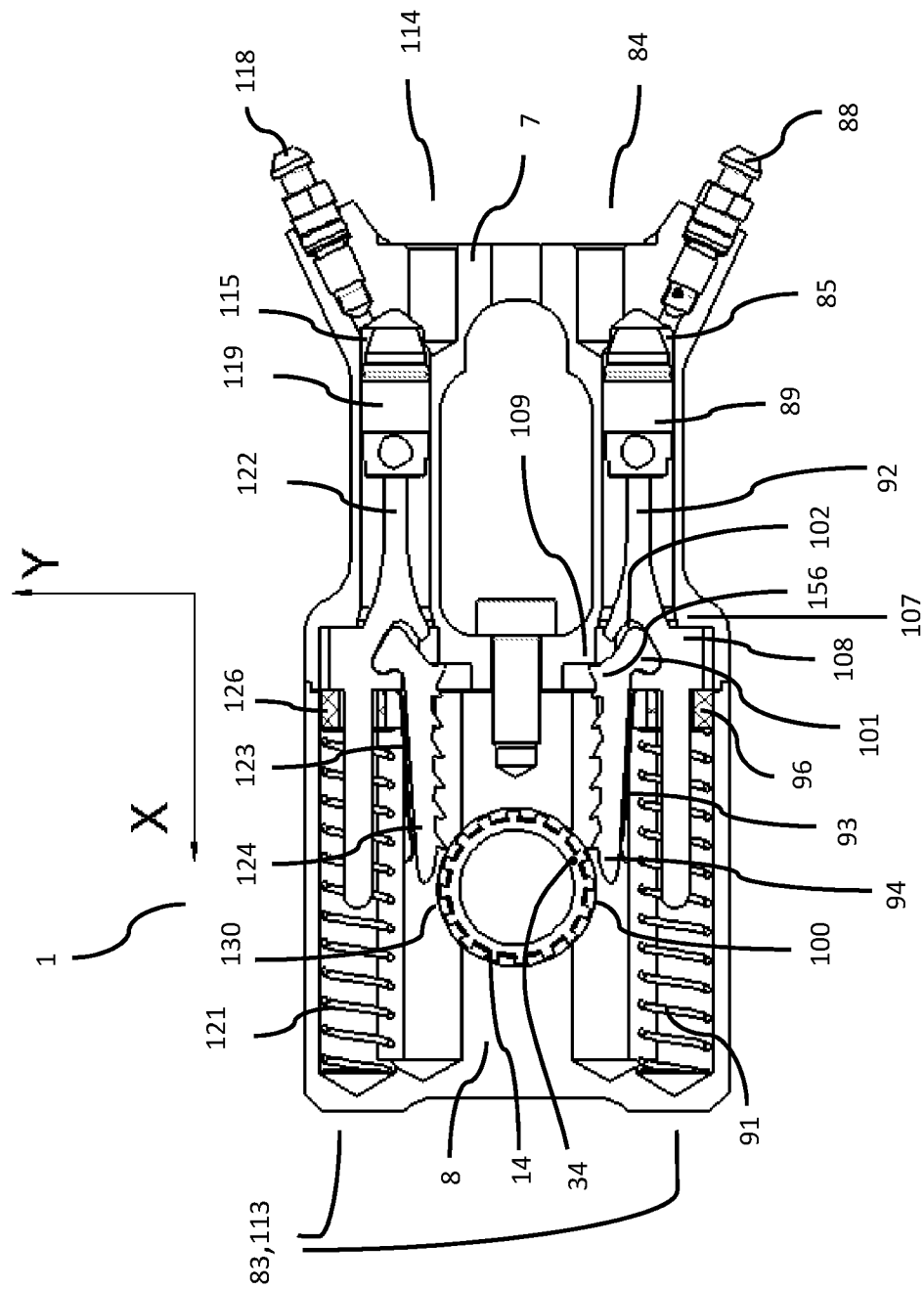
FIGS. 15*a*-15*g* show the actuation cycle.
Figure 15B:
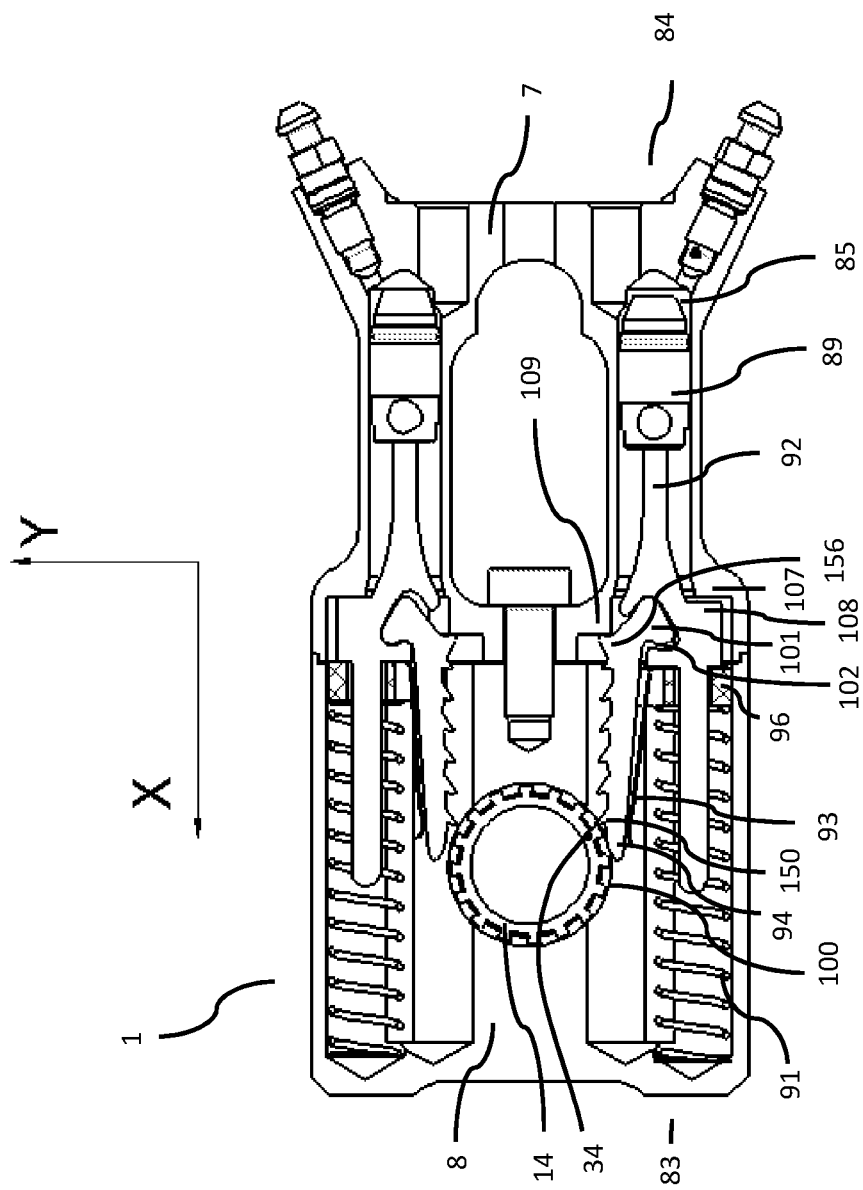
Figure 15C:
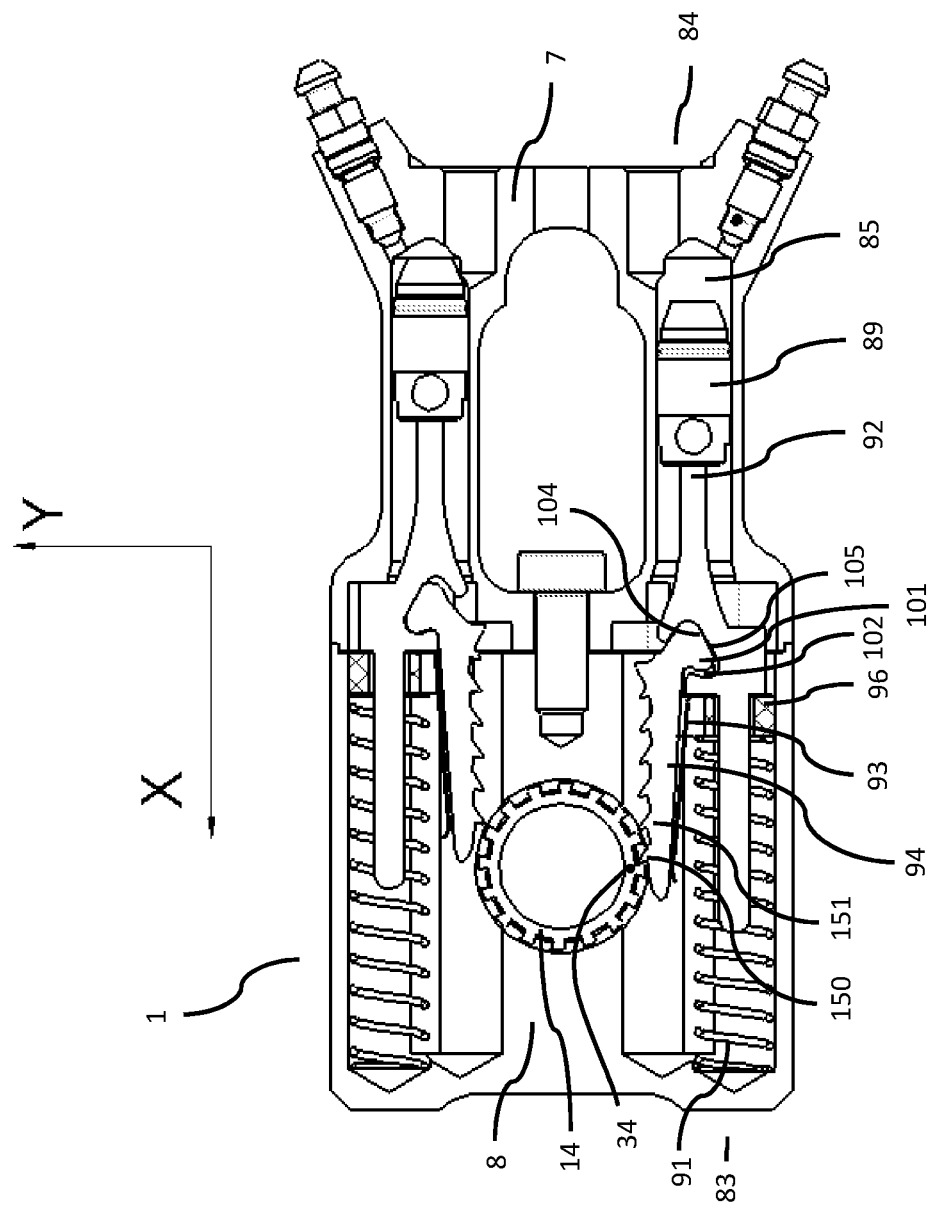
Figure 15D:
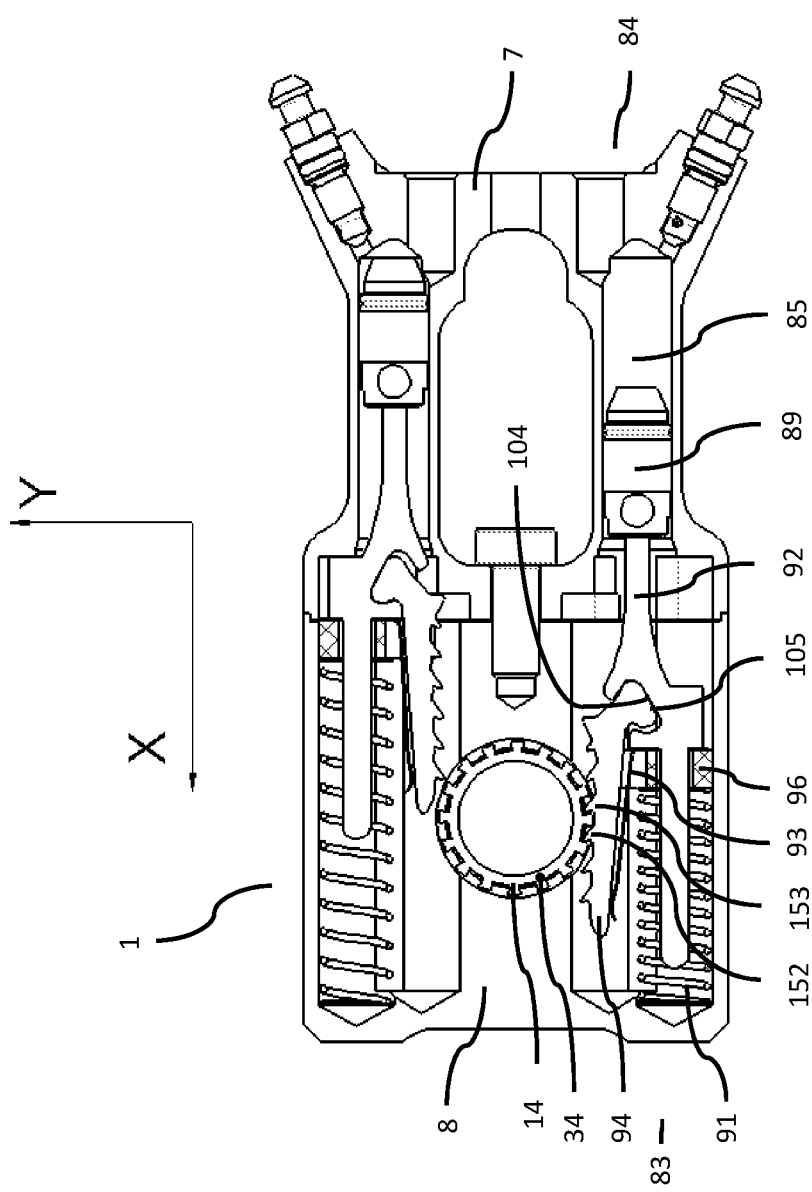
Figure 15E:
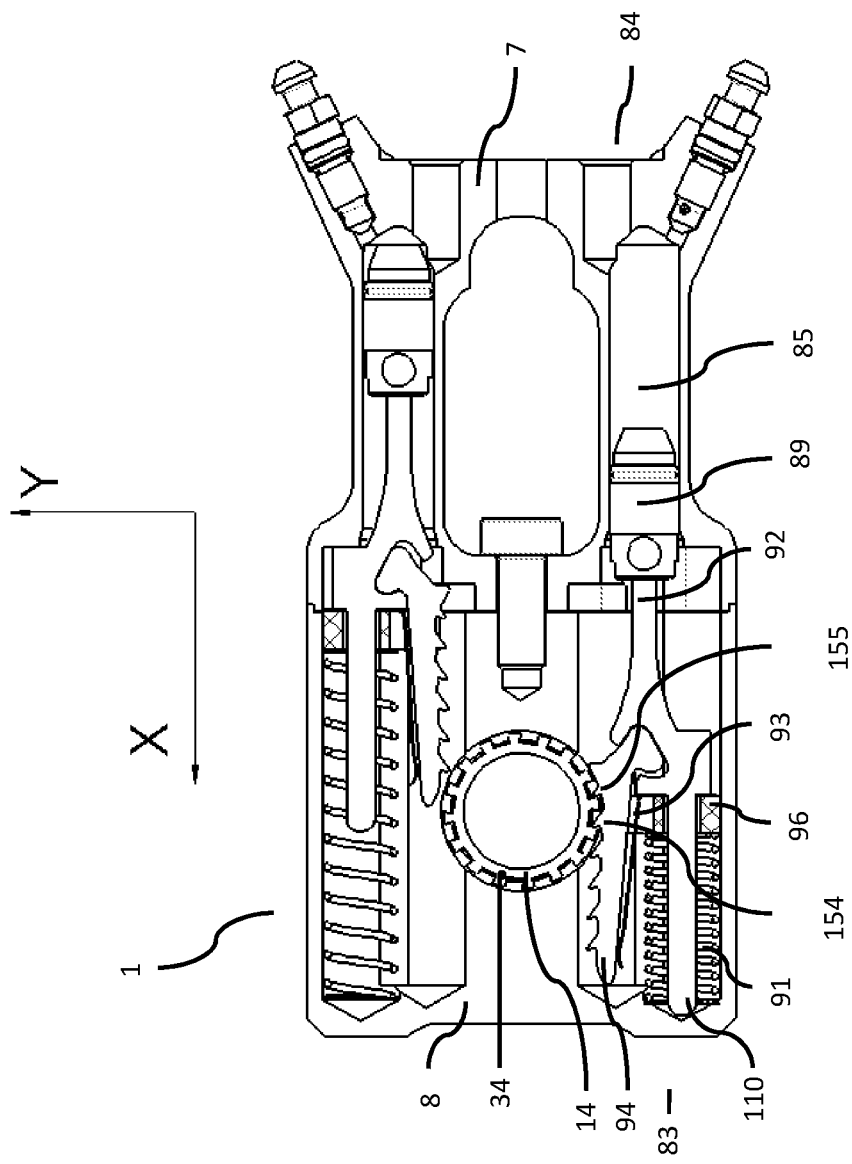
Figure 15F:
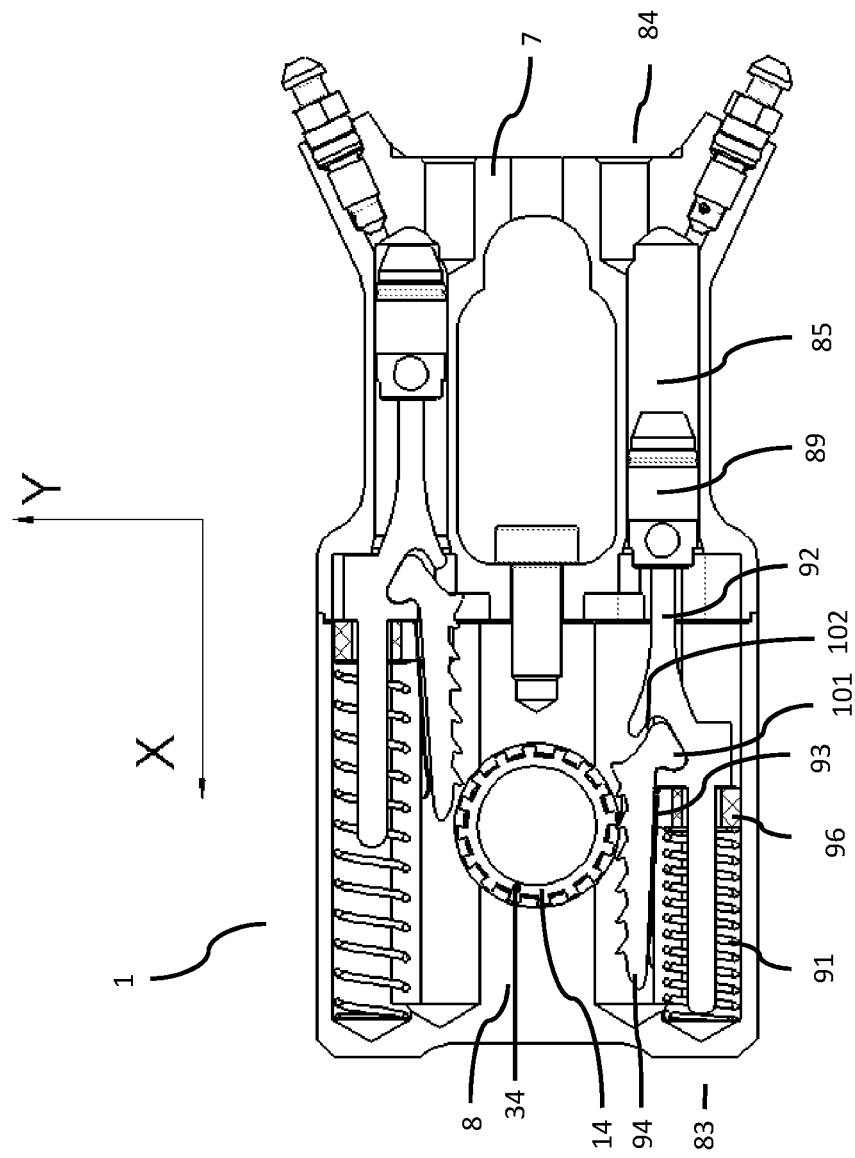
Figure 15G:
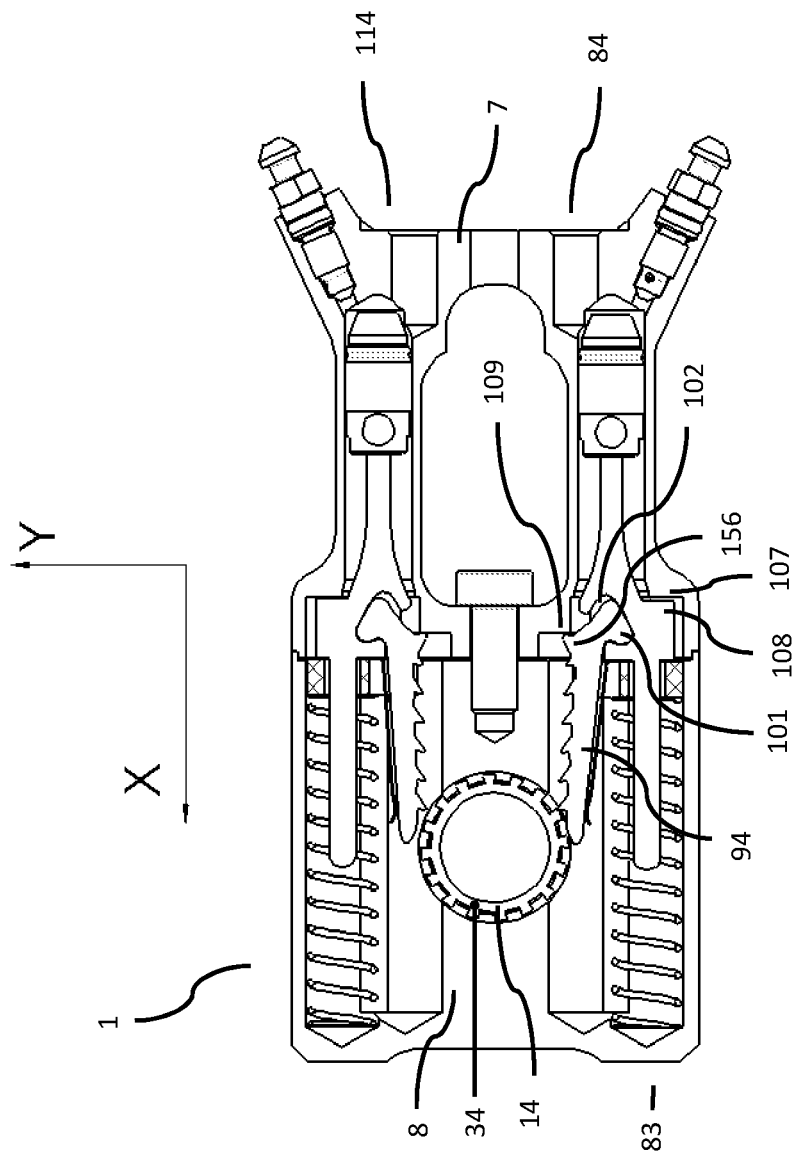

Now, with reference to FIGS. 11-16 and 10b will be explained the function of the invention. Since the actuator (1) and operator (2) are mirrored, it is sufficient to present either side of each. In FIGS. 15a and 16a the clutch (83) and the operator (35) are shown in normal position. The operator lever (39) is not in operation, the return means (42) pushes against the housing (55) and the piston (45), and expands the master chamber (43) to its maximum volume. The linear actuator return means (91) pushes against the lower actuator housing (8) and the push rod (92), and keeps the slave hydraulic chamber (85) compressed to its minimum volume. Notice the position of the indicator point (34) as indication of the circumferential position of the shift element (33) and pinion ring (14). In general, linear movement in the distance of one tooth (150, 151, 152, 153, 154, 155) represents slightly less than 1/16 or 22.5° rotation of the sleeve. In FIG. 15b hydraulic fluid has been displaced through the transfer device (3) to the actuator (1), increasing hydraulic pressure in the relevant slave chamber (85), pushing the slave piston (89) and push rod (92) to slide linearly, compressing the return means (91), releasing tension off the engagement means (93), which laterally pushes the tooth rack (94), in this figure to tilt upward. As the rod (92) moves linearly from its normal position, the linear push rod end stop ledge (108) separates from the upper housing stop (107), and the engagement means (93) then tilts and pivots the rack (94) around the ledge (109), increasing the angle of the rack (94) relative to the X-axis. The tooth rack peninsula (101) slides to the bottom part of the push rod bay (102), and the first engagement tooth (150) goes into operable engagement with the pinion ring (14) at the tooth located closest to the element indicator (34). Shift element rotation is at this point still 0°. In FIG. 15c, increasing hydraulic pressure from the slave chamber (85) has caused the piston (89) to slide longitudinally within the upper actuator housing (7), and shift element rotation at this point is approximately 22.5°. The first tooth (150) is well in engagement with the pinion ring (14), the rack (94) has initiated rotation of said ring (14), and the second tooth (151) is getting ready for engagement. Looking more closely now at how the clutch elements (83) works, consider first that fluid enters the hydraulic chamber (85) while the rotatable pinion ring (14) resists rotation due to spring indexing (not shown). This causes the V-shaped rod bay (102) to push against the correspondingly V-shaped rack peninsula (101), or more specifically, the back flat side of the bay (105) pushes the corresponding flat back side of the peninsula (104), as described above and shown in FIGS. 6-7. As long as linear pressure is maintained the combined rod (92) and rack (94) thereafter move linearly along the X-axis as one part. In FIG. 15d, the actuator section (84) is slightly more than halfway through its engagement stage, the first (150) and second tooth (151) have released, and the third (152) and fourth tooth (153) are in engagement with the pinion ring (14), and shift element rotation at this point is 90°. Continued linear shift force keeps the clutch elements (83) progressing linearly without lateral movement of the rack (94) until it reaches its ultimate actuation position (FIG. 15e), where the linear spring guide (110) has abutted the inner base of the housing (8), and the return means (91) is compressed to the full extent allowed by the actuation sequence. The third (152) and fourth tooth (153) have released the pinion (14), the fifth (154) and sixth tooth (155) are here in engagement, and notice the tooth rack disengagement tooth (156) resting flatly tangentially against the pinion (14). Abutment of the linear spring guide (110) marks the end of the engagement stage after which starts the retraction stage. Full linear piston travel results in shift element rotation of roughly $6/16^{th}$ or 135°. In FIG. 15f, the pressure on the operator lever (not shown) has been released, causing hydraulic pressure to drop in the slave chamber (85), and the return means (91) to push the rod (92) against the piston (89), biasing the clutch (83), displacing hydraulic fluid back as the piston (89) slidingly returns towards normal position. The operator (35, 60) also aids in emptying hydraulic fluid from the slave chamber (85), which will be explained in more detail bellow (FIG. 16). As the rack (94) no longer experiences resistance against the ring (14) and hydraulic pressure on the piston (89) is released, the peninsula (101) and push rod bay (102) will no longer be rigidly pushed against each other, causing the rod (92) and rack (94) to seize to operate as a single linear unit. The rack (94) will have a slight freedom to move in the XY-plane during retraction of the rod (92), and will freewheel across the pinion (14) without rotating the latter, while the bushing (96) ensures that the clutch means (83) does not deviate along the Z-axis. When the piston (89) then closes in on its normal position, pay notice that the tooth rack disengagement tooth (156) abuts the disengagement ledge (109), as seen in FIG. 15g. This pivoting of rack (94) in the XY plane reduces its angle relative to the rod (92), pulls it out of potential engagement with the pinion (14), and moves the peninsula (101) back to the outer side of the bay (102). The rod (92) comes to rest as the upper housing stop (108) reaches the end stop ledge (107), and the rack (94) quickly tucks in against the rod (92) with the least amount of linear travel. This ends the retraction stage of the actuation cycle. The clutch (113) of the other actuator section (114) is identical and mirrored to the first (83), and is provided so as to rotate the pinion (14) in the opposite direction around the center of the system axis.

Figure 16B:
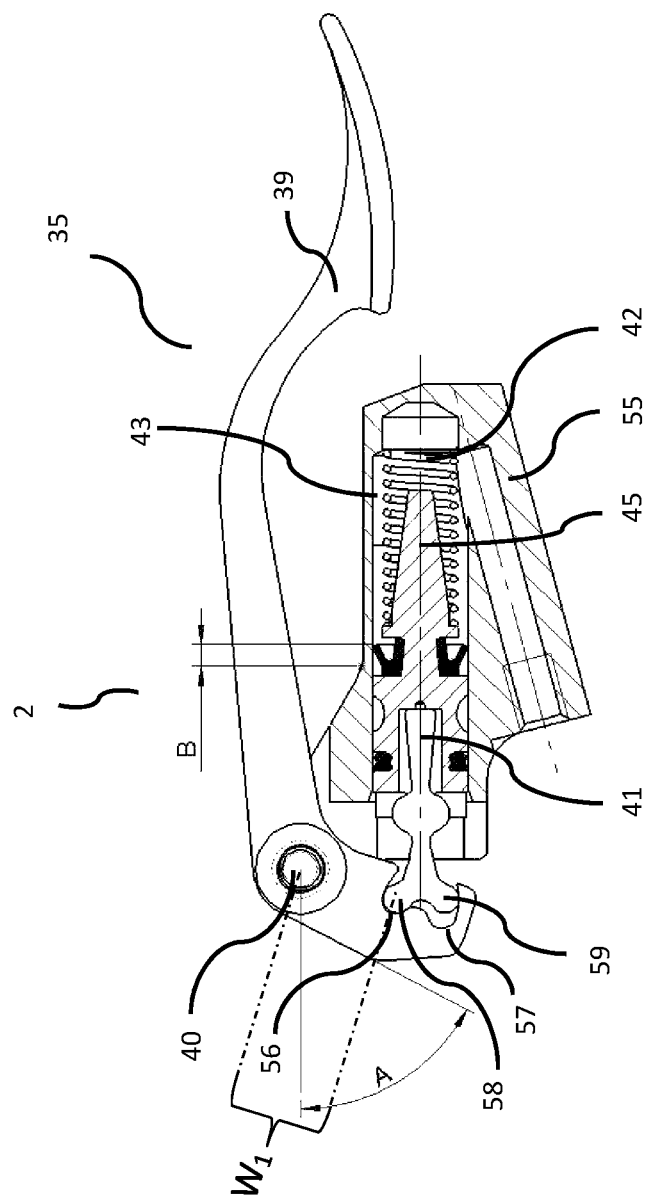
Figure 16C:
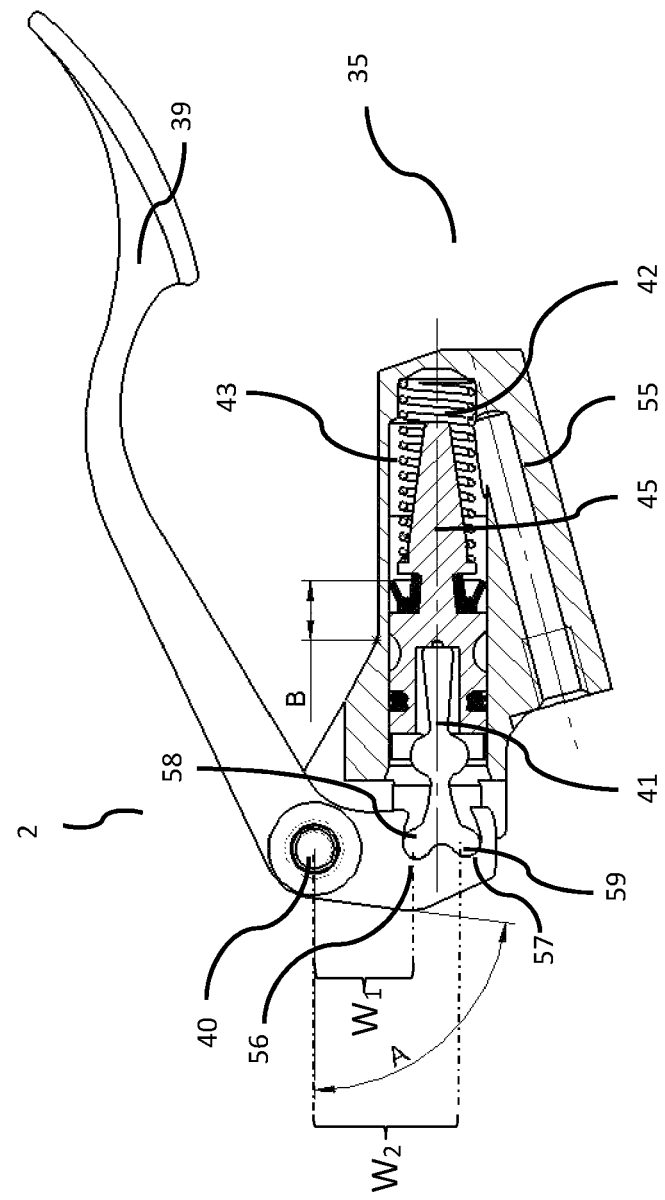
Figure 16D:
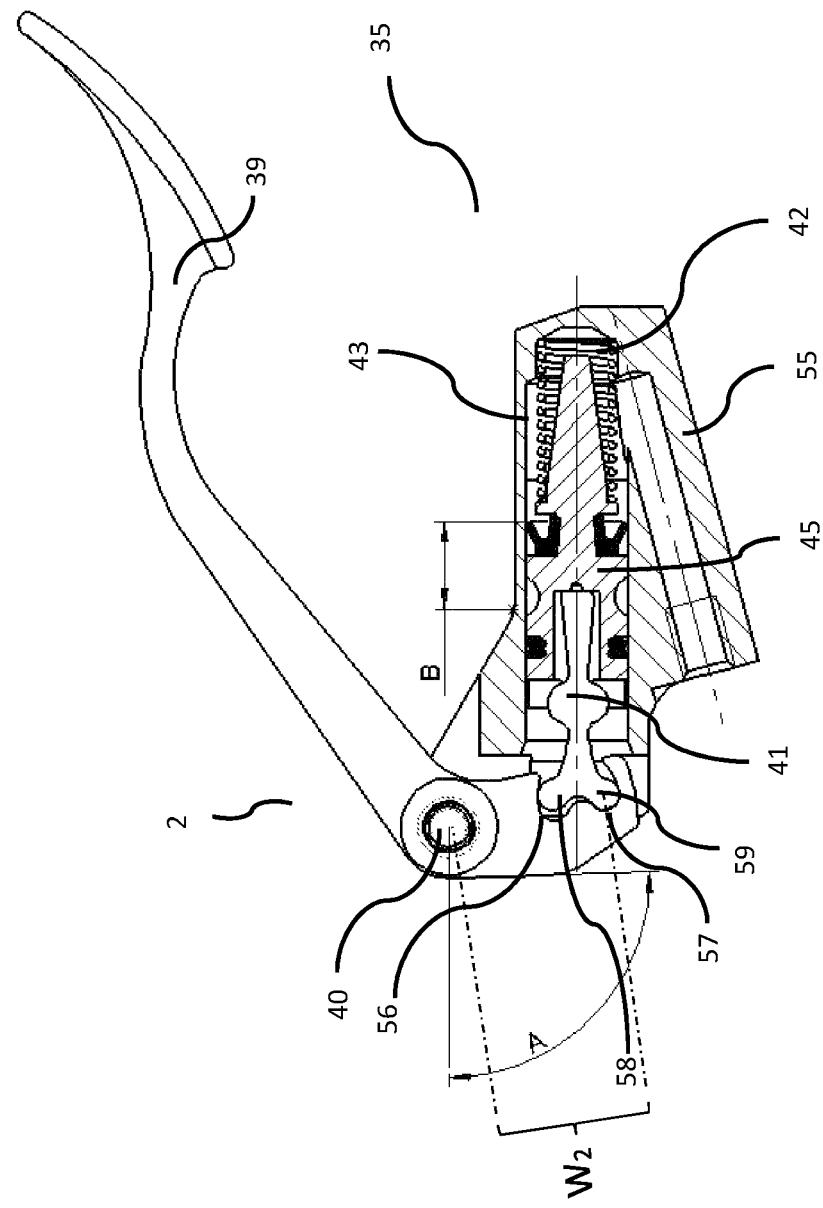
Figure 16E:
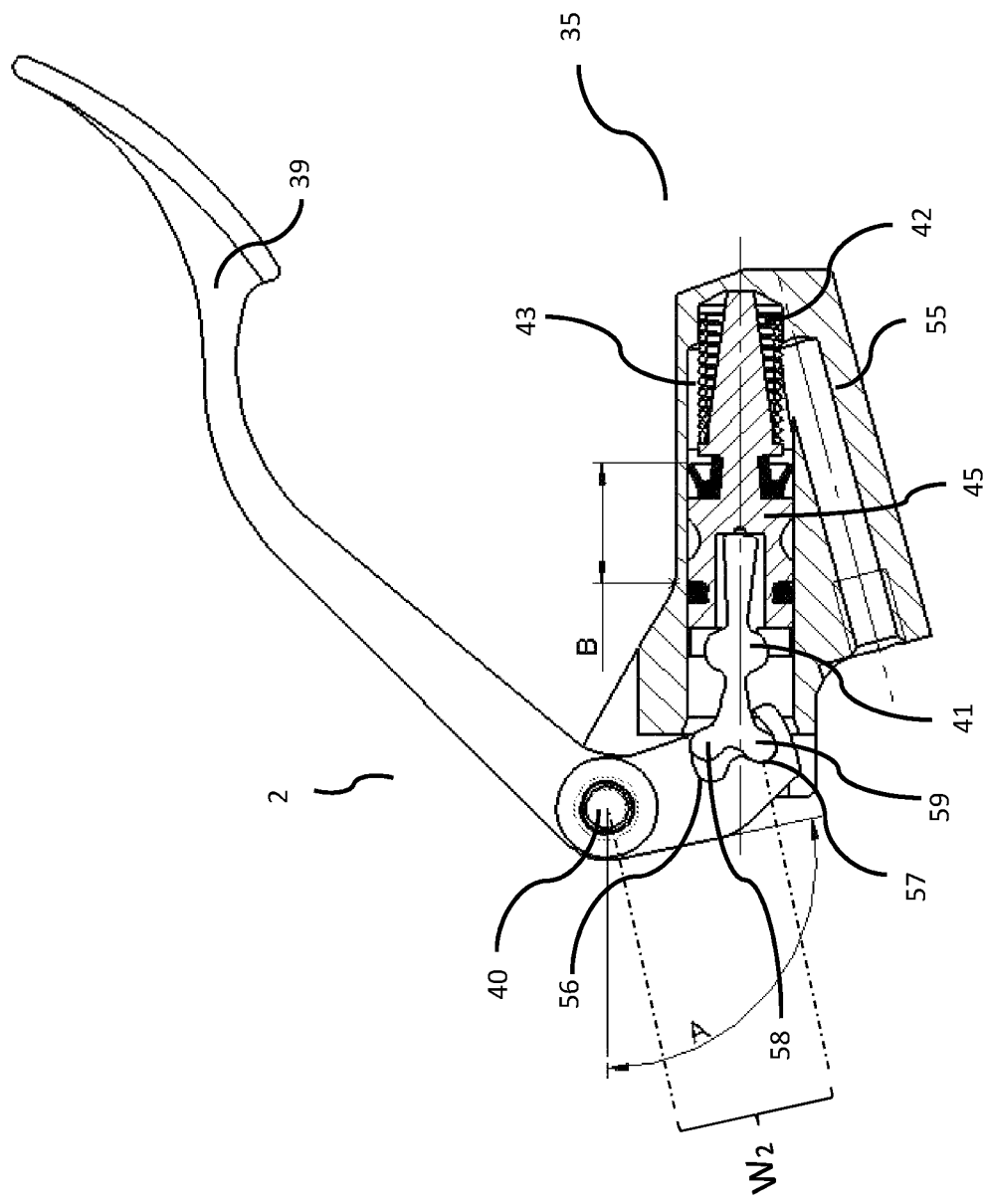

Moving now to the operator, in FIG. 16a the first operator (35) is in normal position. The master return means (42) expands the master hydraulic chamber (43) to its largest volume, pushing the lever (39) to a normal position. FIG. 16b shows the operator as the lever (39) has been pushed and is pivoting on the pivot point (40), the first lever engagement ear (58) engaging with the first push rod engagement bay (56) at distance the lever (39) pushing the push rod (41), pushing the master piston (45) and compressing the master return means (42). This transfers fluid through to the actuator (1) at a certain ratio of lever throw to linear piston travel and fluid displacement, in turn causing a certain degree of rotation of the shift element (33) (not here visible). When the operator reaches the point illustrated by FIG. 16c, both engagement ears (58, 59) are in contact with the lever (39). Shift torque now transfers from the first lever engagement bay (56) to the second lever engagement bay (57), located besides the first and further away from the pivot point (40), at a distance $W_2 > W_1$. As the lever (39) pivots, as in FIG. 16d, the second bay (57) engages with the second engagement ear (59) and the first bay (56) releases the first engagement ear (58). Since the second ear (59) is further away from the pivot point (40), the same amount of lever stroke will now displace a larger amount of fluid from the cylinder (43) than in the first part of the stroke, and a shorter amount of stroke will be necessary to displace the same amount of fluid. Hence, the degrees of rotation of the shift element (33) will increase over the remaining part of the stroke. In FIG. 16e, the lever (39) has reached the end of its stroke, as the piston (45) abuts the bottom end of the cylinder (43). A general graphical expression of the increase in displacement through the lever stroke can be seen in FIG. 10b. When pressure is released from the lever (39), the system returns to normal by means of said means (42), and pulls fluid from the actuator (1). The first part of lever travel A1-A3 transfers a shorter length of piston travel B1-B3, than the second part of lever travel A3-A5, which transfers piston travel B3-B5. Thus the operator (35) accelerates fluid transfer during its stroke. The second operator (60) is mirrored to the first (35) and works in a manner identical.

Figure 4:
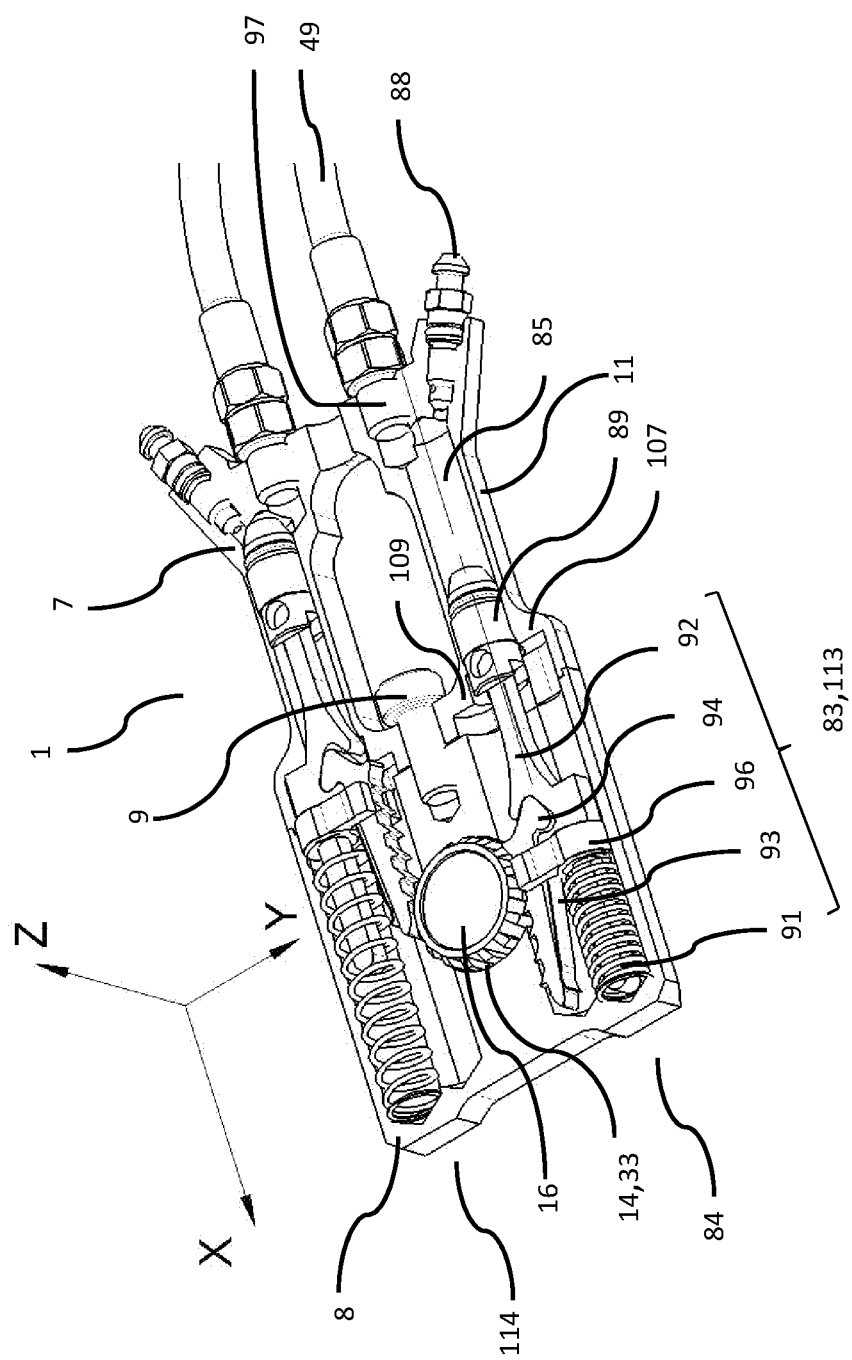
FIG. 4 shows a sideway longitudinal cross section of the actuator.
Figure 5:
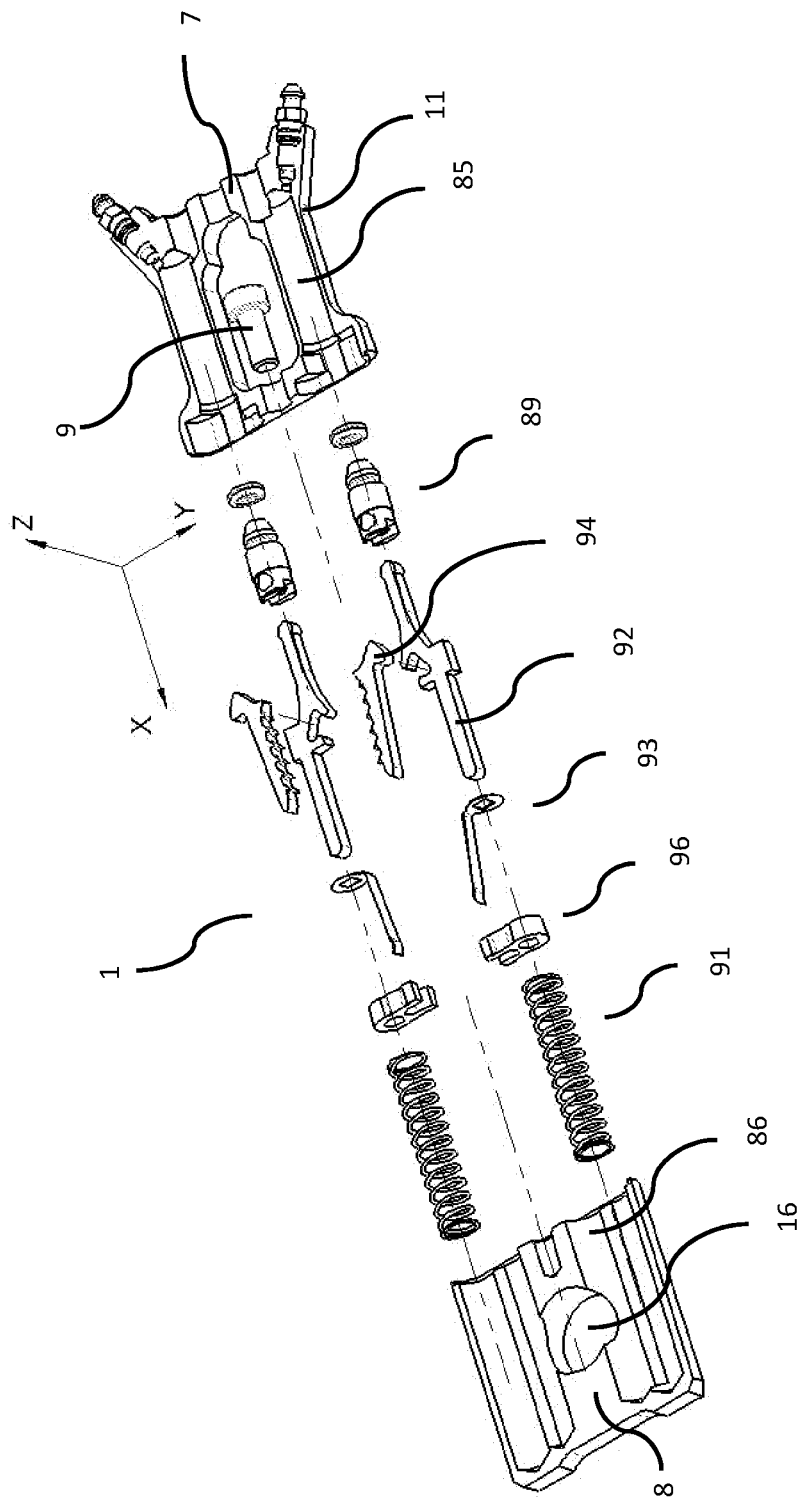
FIG. 5 shows an exploded cross section of the actuator.
Figure 6:
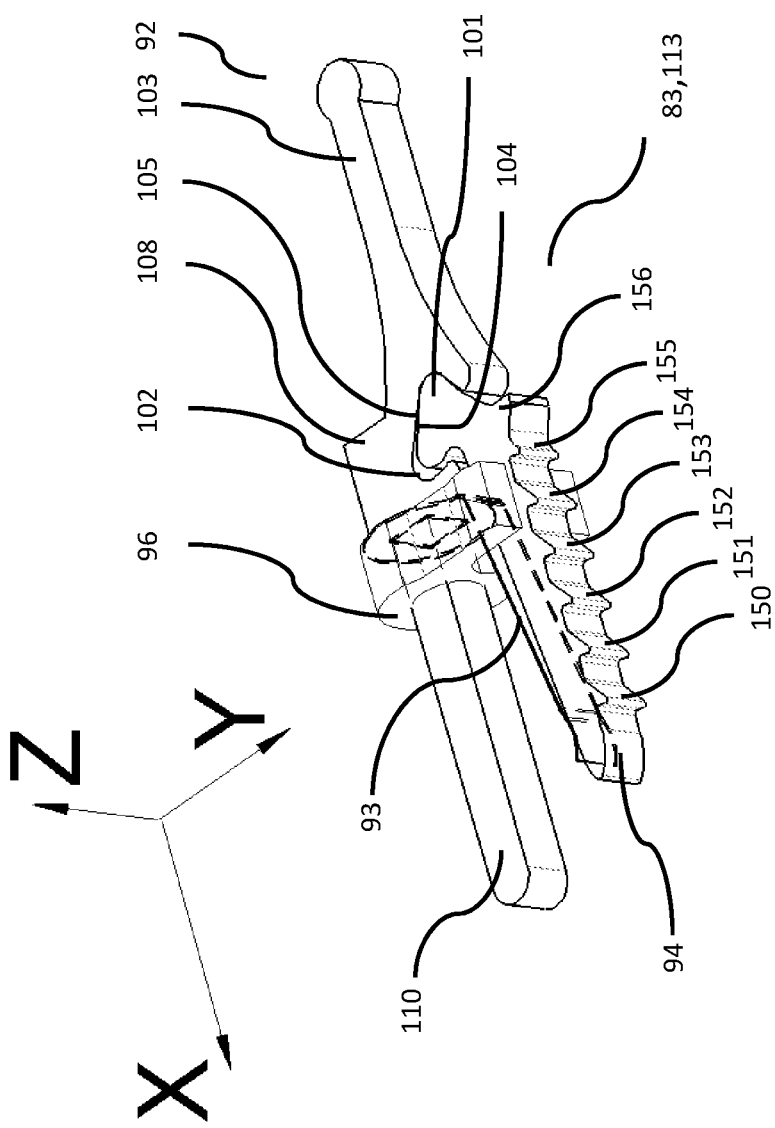
FIGS. 6 and 7 show the clutch mechanism.

With reference now to FIGS. 11-14, the function of the actuator (1) integration with the speed change gear unit (4) will be explained. The main load bearing axle (29) comprises both the gear unit fixed axle (17) and the actuator housing fixed axle (8) and these parts are provided with means so as to be easily separated, and equally simple merged together into one functional unit. First, said sleeve (19) is slid into the fixed axle (17). This prevents radial movement between the actuator (1) and axle (17). Since the cylindrical abutment areas (24, 18) between the fixed axle parts (17, 8) are non-indexed, the actuator (1) and its transfer device (3) may be mounted in an unlimited number of circumferential positions perpendicularly to the axle (29), to best protect the actuator (1) from external impact. Said carrying elements (27, 28) are then aligned collinearly in said frame mounts (6). The through-bolt (30) is tightened, creating inward axial compression load on the frame (6), compressing the outer parts of the frame (6) against the axle (29) on both sides. The large diameter of the axle (17) and the abutment area (24), factor Q, results in a combined rigid system when axial pressure is applied. Said axle (29) may now function as a single, hollow, load bearing axle, and said actuator (1) and speed change gear unit (4) will now function as a single functional unit (300), yet possible to separate without tools into two separate parts when axial pressure is relieved, e.g. the bolt (30) is released. Notice also that no axial pressure is applied to the shift element (33), enabling free operable rotation. To enable shifting of gear mechanisms within the gear unit (4), shift sleeve holes (100, 130), enabling shift torque coming from the transfer device (3), through the actuation chambers (86, 116), to gain radial access and operably rotate the axially protruding shift element (33). Referring now also to FIGS. 1, 4 and 5, notice that the upper (7) and lower actuator housings (8) are separable and joined by a bolt (9) and the right and left sections (84, 114) are mirrored along the longitudinal axis. If the upper housing (7) is separated from the lower housing (8), rotated 180° and reconnected, the first operator (35) will push fluid through the transfer hose (49) into the second slave hydraulic chamber (115), instead of into the first (85). The second slave piston (119) will rotate the shift element (33) in the second direction, shifting the speed change gear unit (4) into the second direction of gear ratios. Similarly, the second operator (60) will push fluid through the transfer hose (74) into the first slave chamber (85), instead of into the second slave chamber (115). The first slave piston (89) is now rotating the shift element (33) in the first direction, shifting the gear unit (4) into the first direction of the gear ratios. Thus, shift operation is switched. Thereby, despite the lower housing (8) being an integral part of the load bearing axle (29) and with a sleeve (19) in one end and stub (27) in the other, because the upper housing (7) is detachable from the lower (8), the system shift direction can still be easily switched.

Additional advantages are now summarized. The gear shift system (200) can be characterized as simple, comprising few parts, easily assemblable, and small and lightweight, making it attractive for its intended purpose. The slim housing (8) and its integration with the gear unit (4) enables placing in a protected spot between the frame mounts (6), reduced weight, and improved system rigidity. The lower actuator housing (8) combines with great rigidity with the gear unit (4) for high performance during use, and separates easily from the wheel without use of tools, which is to benefit during removal of the wheel and replacement of tubes or tires. The mechanisms are functional, precise, and reliable; enable considerable actuation travel and rotation of shift element (33) with each stroke. After actuation, the mechanisms return to normal, ready for a new cycle. The operator (2) enables shifting of many speeds, initiating rotation of the shift element (33) with a low amount of shift torque, yet also shifting through a greater number of speeds with one lever stroke. It also has active operation in two directions, enable riders to force gear changes which would otherwise not have been possible. Twin clutches (83, 113) enable sequential operation, and active shift operation of speed change gear units in both shift directions. Separation of the operator (2) in two enables intuitive paddle-shifting. Due to its self-calibrating nature, mounting is easy. Hydraulic transfer means are well protected from contaminants and thus considered reliable. In combination with indexed two-way gear units, hydraulics aid shifting under torque. As index balls reach the top of an indexation peak, a release of hydraulic pressure occurs, instigating a forceful descent into the next valley, particularly if the hoses are not too rigid. A lighter indexing spring can thus be used, in turn providing a lighter operation feel. Changing which operator (35, 60) shifts towards a higher and lower gear ratio respectively can be done easily and fast.

The invention has now been explained by means of a non-limiting embodiment. While only selected embodiments have been chosen to illustrate the present invention, it is apparent to those skilled in the art from this disclosure that implementation of a number of variations and modifications to the invention as defined in the accompanying claims can be made without departing from the scope of said invention. For example, the size, shape, location or orientation of the various components can be changed at the behest of the inventor, components shown directly connected or contacting each other can have intermediate structures disposed between them, the functions of one element can be performed by multiple, and vice versa, the structures and functions of one embodiment can be adopted in another embodiment, and it is not necessary for all advantages to be present in a particular embodiment at any one time. Every feature which is unique from the prior art, alone or in combination with other features, also should be considered a separate description of further inventions by the applicant, and including the structural and/or functional concepts embodied by such a feature. The foregoing descriptions of the embodiments according to the present invention are provided for illustration only, and not for the purpose of limiting the invention as defined by the appended claims and their equivalents.

| BM | Name | Test |
| --- | --- | --- |
| 1 | Actuator_device | 1 |
| 2 | Operator_device | 2 |
| 3 | Transfer_device | 3 |
| 4 | Speed_change_gear_unit | 4 |
| 5 | Speed_CGU_hub_Shell | 5 |
| 6 | Vehicle_mounts | 6 |
| 7 | Actuator_housing_upper | 7 |
| 8 | Actuator_housing_lower | 8 |
| 9 | Actuator_housing_connection_bolt | 9 |
| 10 | Actuator_pillar_first | 10 |
| 11 | Actuator_pillar_second | 11 |
| 12 | Flat_bicycle_frame_clamp_area | 12 |
| 13 | Shear_force_load_carrying_through_bolt_hole | 13 |
| 14 | Shift_sleeve_rotation_cog | 14 |
| 15 | Chain_cog | 15 |
| 16 | Shift_sleeve_hole | 16 |
| 17 | Main_axle | 17 |
| 18 | Axle_abutment_area | 18 |
| 19 | Axle_entry_sleeve | 19 |
| 20 | Handlebar | 20 |
| 21 | Handlebar_grips | 21 |
| 22 | Operator_housing | 22 |
| 23 | Operator_lever | 23 |
| 24 | Actuator_abutment_area | 24 |
| 25 | Operator_clamp | 25 |
| 26 | Operator_clamp_bolt | 26 |
| 27 | Axle_stub_actuator | 27 |
| 28 | Axle_stub_gearbox | 28 |
| 29 | Load_carrying_main_axle | 29 |
| 30 | Shear_force_load_carrying_through_bolt | 30 |
| 31 | Right_and_left_bicycle_dropouts | 31 |
| 32 | Shift_mechanism_penetrations | 32 |
| 33 | Rotatable_shift_sleeve | 33 |
| 34 | Rotatable_sh_sleeve_indicator | 34 |
| 35 | Right_operator | 35 |
| 36 | Right_reservoir | 36 |
| 37 | Right_reservoir_cover | 37 |
| 38 | Right_diaphragm | 38 |
| 39 | Right_operator_lever | 39 |
| 40 | Right_operator_joint | 40 |
| 41 | Right_operator_push_rod | 41 |
| 42 | Right_operator_return_spring | 42 |
| 43 | Right_operator_hydraulic_chamber | 43 |
| 44 | Right_operator_reservoir_hole | 44 |
| 45 | Right_operator_piston | 45 |
| 46 | Right_operator_quad_ring | 46 |
| 47 | Right_operator_lip_seal | 47 |
| 48 | Right_operator_bleed_nipple | 48 |
| 49 | Right_transfer_device | 49 |

| BM | Name | Test |
|---|---|---|
| 50 | Right_operator_transfer_device_connection_point | 50 |
| 51 | Right_handlebar_clamp | 51 |
| 52 | Right_handlebar_clamp_bolt | 52 |
| 53 | Right_lever_rider_interface_point | 53 |
| 54 | Right_lever_abutment_point | 54 |
| 55 | Right_operator_housing | 55 |
| 56 | R_push rod_1_engagement_bay | 56 |
| 57 | R_push rod_2_engagement_bay | 57 |
| 58 | R_push rod_1_lever_engagement_ear | 58 |
| 59 | R_push rod_2_lever_engagement_ear | 59 |
| 60 | Left_operator | 60 |
| 61 | Left_reservoir | 61 |
| 62 | Left_reservoir_cover | 62 |
| 63 | Left_diaphragm | 63 |
| 64 | Left_operator_lever | 64 |
| 65 | Left_operator_joint | 65 |
| 66 | Left_operator_push_rod | 66 |
| 67 | Left_operator_return_spring | 67 |
| 68 | Left_operator_hydraulic_chamber | 68 |
| 69 | Left_operator_reservoir_hole | 69 |
| 70 | Left_operator_piston | 70 |
| 71 | Left_operator_quad_ring | 71 |
| 72 | Left_operator_lip_seal | 72 |
| 73 | Left_operator_bleed_nipple | 73 |
| 74 | Left_transfer_device | 74 |
| 75 | Left_operator_transfer_device_connection_point | 75 |
| 76 | Left_handlebar_clamp | 76 |
| 77 | Left_handlebar_clamp_bolt | 77 |
| 78 | Left_lever_rider_interface_point | 78 |
| 79 | Left_lever_abutment_point | 79 |
| 80 | Left_operator_housing | 80 |
| 81 | | |
| 82 | | |
| 83 | Right_actuator_1clutch_mechanism | 83 |
| 84 | Right_actuator_section | 84 |
| 85 | Right_actuator_hydraulic_cylinder | 85 |
| 86 | Right_actuation_chamber | 86 |
| 87 | Right_actuation_slot | 87 |
| 88 | Right_actuator_bleed_nipple | 88 |
| 89 | Right_actuator_piston | 89 |
| 90 | Right_tooth_rod_stop | 90 |
| 91 | Right_actuator_linear_return_spring | 91 |
| 92 | Right_actuator_linear_push_rod | 92 |
| 93 | Right_actuator_engagement_spring | 93 |
| 94 | Right_actuator_tooth_rod | 94 |
| 96 | Right_actuator_steering_bushing | 96 |
| 97 | Right_actuator_transfer_device_connection_point | 97 |
| 98 | Right_actuator_pillar | 98 |
| 99 | Right_guide_piston_rod | 99 |
| 100 | Right_actuator_axle_penetration | 100 |
| 101 | Right_actuator_tooth_rod_peninsula | 101 |
| 102 | Right_actuator_push_rod_bay | 102 |
| 103 | Right_actuator_piston_arm | 103 |
| 104 | Right_actuator_tooth_rod_flat_back_section | 104 |
| 105 | Right_actuator_push_rod_flat_back_section | 105 |
| 106 | Right_actuator_clutch_stop | 106 |
| 107 | Right_actuator_upper_housing_stop | 107 |
| 108 | Right_act_push rod_endstop_ledge | 108 |
| 109 | Right_act_tooth_rack_disengagement_ledge | 109 |
| 110 | Right_actuator_linear_spring_guide | 110 |
| 111 | | |
| 112 | | |
| 113 | Left_actuator_1clutch_mechanism | 113 |
| 114 | Left_actuator_section | 114 |
| 115 | Left_actuator_hydraulic_cylinder | 115 |
| 116 | Left_actuation_chamber | 116 |
| 117 | Left_actuation_slot | 117 |
| 118 | Left_actuator_bleed_nipple | 118 |
| 119 | Left_actuator_piston | 119 |
| 120 | Left_tooth_rod_stop | 124 |
| 121 | Left_actuator_linear_return_spring | 121 |
| 122 | Left_actuator_linear_push_rod | 122 |
| 123 | Left_actuator_engagement_spring | 123 |
| 124 | Left_actuator_tooth_rod | 124 |
| 126 | Left_actuator_steering_bushing | 126 |
| 127 | Left_actuator_transfer_device_connection_point | 127 |
| 128 | Left_actuator_pillar | 128 |
| 129 | Left_guide_piston_rod | 129 |
| 130 | Left_actuator_axle_penetration | 130 |
| 131 | Left_actuator_tooth_rod_peninsula | 131 |
| 132 | Left_actuator_push_rod_bay | 132 |
| 133 | Left_actuator_piston_arm | 133 |
| 134 | Left_actuator_tooth_rod_flat_back_section | 134 |
| 135 | Left_actuator_push_rod_flat_back_section | 135 |
| 136 | Left_actuator_clutch_stop | 136 |
| 137 | | |
| 138 | | |
| 139 | | |
| 140 | Shift_sleeve_indentation_cog | 140 |
| 141 | Indentation_ball | 141 |
| 142 | Indentation_spring | 142 |
| 143 | Indentation_valley | 143 |
| 144 | Indentation_peak | 144 |
| 145 | | |
| 146 | | |
| 147 | | |
| 148 | | |
| 149 | | |
| 150 | Tooth_1 | 150 |
| 151 | Tooth_2 | 151 |
| 152 | Tooth_3 | 152 |
| 153 | Tooth_4 | 153 |
| 154 | Tooth_5 | 154 |
| 155 | Tooth_6 | 155 |
| 156 | Tooth_disengagement | 156 |
| 157 | | |
| 158 | | |
| 159 | | |
| 160 | | |
| 161 | | |
| 162 | | |
| 163 | | |
| 164 | | |
| 165 | | |
| 200 | Gear_shift_unit | 200 |
| 300 | Gear_system | 300 |

The invention claimed is:

1. A pedally propelled vehicle gear shift actuator configured to be arranged about a rotatable gear shift element of a hub gear, the gear shift actuator comprising:
   first and second clutch elements actuated by hydraulic pistons; and
   first and second return elements;
   wherein:
   the first and second clutch elements are arranged to be disengaged from the gear shift element in an initial position;
   the first clutch element is arranged to engage with and rotate the gear shift element in a first rotational direction, when the first clutch element moves in a first linear direction from the initial position;
   the second clutch element is arranged to engage with and rotate the gear shift element in a second rotational direction opposite the first rotational direction, when the second clutch element moves in a second linear direction from the initial position;
   the first and second clutch elements are arranged to disengage from the gear shift element when moved in a direction opposite the first and second linear directions, respectively; and
   the first and second return elements provide a return force to the first and second clutch elements opposite the first and second linear directions, respectively, to independently return the first and second clutch elements to the initial position.

2. The pedally propelled vehicle gear shift actuator according to claim 1, wherein:
the first clutch element is arranged to rotate the gear shift element at least 30, 40, 50, or 60 degrees in the first rotational direction.

3. The pedally propelled vehicle gear shift actuator according to claim 1, wherein:
the second clutch element is arranged to rotate the gear shift element at least 30, 40, 50, or 60 degrees in the second rotational direction.

4. The pedally propelled vehicle gear shift actuator according to claim 1, the first and second clutch elements, each further comprising an engagement rack with at least two engagement teeth, and wherein the gear shift element further comprises a circle of pinion teeth, wherein:
the engagement teeth of the first and second clutch elements are configured to respectively mesh with the pinion teeth when moved in the first linear direction and the second linear direction, respectively.

5. The pedally propelled vehicle gear shift actuator according to claim 4, wherein:
the engagement teeth of the first and second clutch elements are respectively configured to freewheel across the pinion teeth when the engagement rack is moved in a direction opposite the first linear direction and the second linear direction, respectively.

6. The pedally propelled vehicle gear shift actuator according to claim 4, further comprising a pivoting element, wherein:
the rack is configured to pivot laterally on the pivoting element towards an engagement position with the shift element when the first or second clutch element moves in the first linear direction or the second linear direction from the initial position;
the rack configured to pivot laterally on the pivoting element in a direction away from a position of engagement with the shift element when the first and second clutch elements respectively move in directions opposite the first and second linear direction.

7. The pedally propelled vehicle gear shift actuator according to claim 4, comprising a lateral engagement portion, wherein:
the lateral engagement portion is configured to cause the rack to engage laterally with the shift element.

8. The pedally propelled vehicle gear shift actuator according to claim 4, comprising a first and second linearly operated rod, and collinear subjoining element, wherein:
the collinear subjoining element causes the rack to move collinearly with the linear rods in the first or second linear direction.

9. The pedally propelled vehicle gear shift actuator according to claim 1, wherein:
the gear shift actuator is selectively separable from the hub gear, and re-combinable with the hub gear at a 180 degree interval;
the first clutch element is arranged to engage with the gear shift element, and rotate the gear shift element in the second rotational direction, when moving in the first linear direction from the initial position; and
the second clutch element is arranged to engage with the gear shift element, and rotate the gear shift element in the first rotational direction, when moving in the second linear direction from the initial position.

10. A pedally propelled vehicle gear shift system, comprising:
a gear shift actuator according to claim 1;
first and second vehicle gear shift operators each including:
a body;
a push rod; and
a lever pivotally connected to the body at a pivot point, the lever arranged to move between an initial position and a fully operated position;
wherein the lever is arranged to engage with the push rod at a first distance from the pivot point in the initial position; and
wherein the lever is arranged to engage with the push rod at a second distance from the pivot point in the fully operated position, wherein the second distance is greater than the first distance;
first and second hydraulic transfer devices interconnecting the gear shift actuator to the gear shift operators, respectively; and
wherein the first and second gear shift operators are arranged to operate the first and second clutch elements, respectively.

11. The pedally propelled vehicle gear shift system, according to claim 10, wherein:
the gear shift actuator is selectively separable from the hub gear, and re-combinable with the hub gear at a 180 degree interval; and
the first and second gear shift operators are arranged to operate the second and first clutch elements, respectively.

* * * * *